US009548002B2

United States Patent
Black et al.

(10) Patent No.: US 9,548,002 B2
(45) Date of Patent: Jan. 17, 2017

(54) FIRST ENTRY MODEL

(71) Applicant: Applied Medical Resources Corporation, Rancho Santa Margarita, CA (US)

(72) Inventors: Katie Black, Rancho Santa Margarita, CA (US); Nikolai Poulsen, Rancho Santa Margarita, CA (US); Heidi Holmes, Rancho Santa Margarita, CA (US); Natasha Felsinger, Rancho Santa Margarita, CA (US); Tracy Breslin, Rancho Santa Margarita, CA (US); Kennii Pravongviengkham, Rancho Santa Margarita, CA (US); Boun Pravong, Rancho Santa Margarita, CA (US); Eduardo Bolanos, Rancho Santa Margarita, CA (US); Zoran Falkenstein, Rancho Santa Margarita, CA (US); Charles C. Hart, Rancho Santa Margarita, CA (US); Tina Talwar, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 180 days.

(21) Appl. No.: 14/340,234

(22) Filed: Jul. 24, 2014

(65) Prior Publication Data

US 2015/0031008 A1 Jan. 29, 2015

Related U.S. Application Data

(60) Provisional application No. 61/857,982, filed on Jul. 24, 2013, provisional application No. 61/971,714, filed on Mar. 28, 2014.

(51) Int. Cl.
*G09B 23/28* (2006.01)

(52) U.S. Cl.
CPC .................... *G09B 23/285* (2013.01)

(58) Field of Classification Search
USPC .......... 434/262, 267, 268, 269, 272
See application file for complete search history.

(56) References Cited

U.S. PATENT DOCUMENTS

| 184,573 A | 11/1876 | Becker |
| 2,284,888 A | 6/1942 | Arnell, Jr. |

(Continued)

FOREIGN PATENT DOCUMENTS

| CN | 2421706 Y | 2/2001 |
| CN | 2751372 Y | 1/2006 |

(Continued)

OTHER PUBLICATIONS

European Patent Office, International Search Report for International Application No. PCT/US2011/053859 A3, mailed on May 4, 2012, entitled "Portable Laparoscopic Trainer".

(Continued)

*Primary Examiner* — Kurt Fernstrom
(74) *Attorney, Agent, or Firm* — Rimas T. Lukas

(57) ABSTRACT

A simulated abdominal wall model that is ideal for practicing laparoscopic first entry surgical techniques is provided. The model includes a simulated abdominal wall portion captured between two frame elements of a support. The support is connectable to a surgical trainer. When connected to the trainer, the model provides a penetrable abdominal tissue portion for accessing an internal cavity of the trainer. The simulated abdominal wall includes a plurality of layers including a skin layer, a fabric posterior rectus sheath layer, a simulated fat layer of low-resilience polyurethane foam and at least two layers that provide distinctive haptic feed- (Continued)

back upon penetration of the simulated transversalis fascia and muscle layers. The simulated abdominal wall includes a simulated umbilicus across several layers of simulated tissue.

22 Claims, 10 Drawing Sheets

(56) References Cited

U.S. PATENT DOCUMENTS

| | | | |
|---|---|---|---|
| 2,324,702 A | 7/1943 | Hoffman et al. | |
| 2,345,489 A | 3/1944 | Lord | |
| 2,495,568 A | 1/1950 | Coel | |
| 3,766,666 A | 10/1973 | Stroop | |
| 3,775,865 A | 12/1973 | Rowan | |
| 3,921,311 A | 11/1975 | Beasley et al. | |
| 3,991,490 A | 11/1976 | Markman | |
| 4,001,951 A | 1/1977 | Fasse | |
| 4,001,952 A | 1/1977 | Kleppinger | |
| 4,321,047 A | 3/1982 | Landis | |
| 4,323,350 A | 4/1982 | Bowden, Jr. | |
| 4,332,569 A | 6/1982 | Burbank | |
| 4,371,345 A | 2/1983 | Palmer et al. | |
| 4,386,917 A | 6/1983 | Forrest | |
| 4,459,113 A | 7/1984 | Boscaro Gatti et al. | |
| 4,481,001 A | 11/1984 | Graham et al. | |
| 4,596,528 A | 6/1986 | Lewis et al. | |
| 4,726,772 A | 2/1988 | Amplatz | |
| 4,737,109 A | 4/1988 | Abramson | |
| 4,789,340 A | 12/1988 | Zikria | |
| 4,832,978 A | 5/1989 | Lesser | |
| 4,867,686 A | 9/1989 | Goldstein | |
| 4,907,973 A | 3/1990 | Hon | |
| 4,938,696 A | 7/1990 | Foster et al. | |
| 4,940,412 A | 7/1990 | Blumenthal | |
| 5,061,187 A | 10/1991 | Jerath | |
| 5,104,328 A * | 4/1992 | Lounsbury | G09B 23/34 434/267 |
| 5,149,270 A | 9/1992 | McKeown | |
| 5,180,308 A | 1/1993 | Garito et al. | |
| 5,230,630 A | 7/1993 | Burgett | |
| 5,273,435 A | 12/1993 | Jacobson | |
| 5,295,694 A | 3/1994 | Levin | |
| 5,310,348 A | 5/1994 | Miller | |
| 5,318,448 A | 6/1994 | Garito et al. | |
| 5,320,537 A | 6/1994 | Watson | |
| 5,358,408 A | 10/1994 | Medina | |
| 5,368,487 A | 11/1994 | Medina | |
| 5,380,207 A | 1/1995 | Siepser | |
| 5,403,191 A * | 4/1995 | Tuason | G09B 23/285 434/262 |
| 5,425,644 A | 6/1995 | Szinicz | |
| 5,425,731 A | 6/1995 | Daniel et al. | |
| 5,472,345 A | 12/1995 | Eggert | |
| 5,518,406 A * | 5/1996 | Waters | G09B 23/285 434/267 |
| 5,518,407 A | 5/1996 | Greenfield et al. | |
| 5,541,304 A | 7/1996 | Thompson | |
| 5,620,326 A * | 4/1997 | Younker | G09B 23/28 434/268 |
| 5,722,836 A | 3/1998 | Younker | |
| 5,727,948 A | 3/1998 | Jordan | |
| 5,743,730 A | 4/1998 | Clester et al. | |
| 5,769,640 A | 6/1998 | Jacobus et al. | |
| 5,775,916 A | 7/1998 | Cooper et al. | |
| 5,785,531 A | 7/1998 | Leung | |
| 5,800,178 A | 9/1998 | Gillio | |
| 5,803,746 A | 9/1998 | Barrie et al. | |
| 5,850,033 A * | 12/1998 | Mirzeabasov | G09B 23/28 434/267 |
| 5,873,732 A | 2/1999 | Hasson | |
| 5,873,863 A | 2/1999 | Komlosi | |
| 5,908,302 A | 6/1999 | Goldfarb | |
| 5,947,743 A * | 9/1999 | Hasson | G09B 23/286 434/262 |
| 5,947,744 A * | 9/1999 | Izzat | G09B 23/28 434/262 |
| 5,951,301 A | 9/1999 | Younker | |
| 6,083,008 A | 7/2000 | Yamada et al. | |
| 6,113,395 A | 9/2000 | Hon | |
| 6,234,804 B1 | 5/2001 | Yong | |
| 6,336,812 B1 | 1/2002 | Cooper et al. | |
| 6,398,557 B1 | 6/2002 | Hoballah | |
| 6,474,993 B1 | 11/2002 | Grund et al. | |
| 6,485,308 B1 | 11/2002 | Goldstein | |
| 6,488,507 B1 | 12/2002 | Stoloff et al. | |
| 6,497,902 B1 | 12/2002 | Ma | |
| 6,511,325 B1 | 1/2003 | Lalka et al. | |
| 6,517,354 B1 | 2/2003 | Levy | |
| 6,568,941 B1 | 5/2003 | Goldstein | |
| 6,654,000 B2 | 11/2003 | Rosenberg | |
| 6,659,776 B1 | 12/2003 | Aumann et al. | |
| 6,773,263 B2 | 8/2004 | Nicholls et al. | |
| 6,780,016 B1 | 8/2004 | Toly | |
| 6,854,976 B1 | 2/2005 | Suhr | |
| 6,857,878 B1 | 2/2005 | Chosack et al. | |
| 6,863,536 B1 | 3/2005 | Fisher et al. | |
| 6,866,514 B2 | 3/2005 | Von Roeschlaub et al. | |
| 6,887,082 B2 | 5/2005 | Shun | |
| 6,929,481 B1 | 8/2005 | Alexander et al. | |
| 6,939,138 B2 | 9/2005 | Chosack et al. | |
| 6,960,617 B2 | 11/2005 | Omidian et al. | |
| 6,997,719 B2 | 2/2006 | Wellman et al. | |
| 7,008,232 B2 | 3/2006 | Brassel | |
| 7,018,327 B1 | 3/2006 | Conti | |
| 7,056,123 B2 | 6/2006 | Gregorio et al. | |
| 7,080,984 B1 | 7/2006 | Cohen | |
| 7,255,565 B2 | 8/2007 | Keegan | |
| 7,272,766 B2 | 9/2007 | Sakezles | |
| 7,404,716 B2 | 7/2008 | Gregorio et al. | |
| 7,419,376 B2 | 9/2008 | Sarvazyan et al. | |
| 7,427,199 B2 | 9/2008 | Sakezles | |
| 7,465,168 B2 | 12/2008 | Allen et al. | |
| 7,467,075 B2 | 12/2008 | Humphries et al. | |
| 7,544,062 B1 | 6/2009 | Hauschild et al. | |
| 7,553,159 B1 | 6/2009 | Arnal et al. | |
| 7,575,434 B2 | 8/2009 | Palakodeti | |
| 7,594,815 B2 | 9/2009 | Toly | |
| 7,621,749 B2 | 11/2009 | Munday | |
| 7,646,901 B2 | 1/2010 | Murphy et al. | |
| 7,648,367 B1 | 1/2010 | Makower et al. | |
| 7,677,897 B2 | 3/2010 | Sakezles | |
| 7,775,916 B1 | 8/2010 | Mahoney | |
| 7,780,451 B2 | 8/2010 | Willobee et al. | |
| 7,802,990 B2 | 9/2010 | Korndorffer et al. | |
| 7,806,696 B2 | 10/2010 | Alexander et al. | |
| 7,833,018 B2 | 11/2010 | Alexander et al. | |
| 7,837,473 B2 | 11/2010 | Koh | |
| 7,850,454 B2 | 12/2010 | Toly | |
| 7,850,456 B2 | 12/2010 | Chosack et al. | |
| 7,854,612 B2 | 12/2010 | Frassica et al. | |
| 7,857,626 B2 | 12/2010 | Toly | |
| 7,866,983 B2 | 1/2011 | Hemphill et al. | |
| 7,931,470 B2 | 4/2011 | Alexander et al. | |
| 7,931,471 B2 * | 4/2011 | Senagore | G09B 23/285 434/267 |
| 7,988,992 B2 | 8/2011 | Omidian et al. | |
| 7,993,140 B2 | 8/2011 | Sakezles | |
| 7,997,903 B2 | 8/2011 | Hasson et al. | |
| 8,007,281 B2 | 8/2011 | Toly | |
| 8,007,282 B2 | 8/2011 | Gregorio et al. | |
| 8,021,162 B2 | 9/2011 | Sui | |
| 8,137,110 B2 | 3/2012 | Sakezles | |
| 8,221,129 B2 | 7/2012 | Parry et al. | |
| 8,297,982 B2 * | 10/2012 | Park | G09B 23/34 434/262 |
| 8,323,028 B2 | 12/2012 | Matanhelia | |
| 8,323,029 B2 | 12/2012 | Toly | |
| 8,328,560 B2 | 12/2012 | Niblock et al. | |
| 8,403,674 B2 | 3/2013 | Feygin et al. | |
| 8,403,675 B2 | 3/2013 | Stoianovici et al. | |
| 8,403,676 B2 | 3/2013 | Frassica et al. | |

(56) References Cited

U.S. PATENT DOCUMENTS

| | | | |
|---|---|---|---|
| 8,408,920 B2 | 4/2013 | Speller | |
| 8,425,234 B2 | 4/2013 | Sakezles | |
| 8,439,687 B1 | 5/2013 | Morriss et al. | |
| 8,454,368 B2 | 6/2013 | Ault et al. | |
| 8,460,002 B2 | 6/2013 | Wang et al. | |
| 8,469,715 B2 | 6/2013 | Ambrozio | |
| 8,469,716 B2 * | 6/2013 | Fedotov | G09B 23/285 434/262 |
| 8,480,407 B2 | 7/2013 | Campbell et al. | |
| 8,480,408 B2 | 7/2013 | Ishii et al. | |
| 8,491,309 B2 | 7/2013 | Parry et al. | |
| 8,512,044 B2 | 8/2013 | Sakezles | |
| 8,535,062 B2 | 9/2013 | Nguyen | |
| 8,556,635 B2 * | 10/2013 | Toly | G09B 23/285 434/262 |
| 8,608,483 B2 | 12/2013 | Trotta et al. | |
| 8,613,621 B2 | 12/2013 | Hendrickson et al. | |
| 8,636,520 B2 | 1/2014 | Iwasaki et al. | |
| D699,297 S | 2/2014 | Bahsoun et al. | |
| 8,641,423 B2 | 2/2014 | Gumkowski | |
| 8,647,125 B2 | 2/2014 | Johns et al. | |
| 8,678,831 B2 | 3/2014 | Trotta et al. | |
| 8,679,279 B2 | 3/2014 | Thompson et al. | |
| 8,696,363 B2 | 4/2014 | Gray et al. | |
| 8,708,707 B2 | 4/2014 | Hendrickson et al. | |
| 8,764,449 B2 | 7/2014 | Rios et al. | |
| 8,764,452 B2 | 7/2014 | Pravong et al. | |
| 8,801,437 B2 | 8/2014 | Mousques | |
| 8,801,438 B2 | 8/2014 | Sakezles | |
| 8,808,004 B2 | 8/2014 | Misawa et al. | |
| 8,814,573 B2 | 8/2014 | Nguyen | |
| 8,870,576 B2 | 10/2014 | Millon et al. | |
| 8,888,498 B2 | 11/2014 | Bisaillon et al. | |
| 8,911,238 B2 | 12/2014 | Forsythe | |
| 8,915,742 B2 | 12/2014 | Hendrickson et al. | |
| 8,961,190 B2 | 2/2015 | Hart et al. | |
| 8,966,954 B2 | 3/2015 | Ni et al. | |
| 8,968,003 B2 | 3/2015 | Hendrickson et al. | |
| 9,017,080 B1 | 4/2015 | Placik | |
| 9,056,126 B2 | 6/2015 | Hersel et al. | |
| 9,070,306 B2 | 6/2015 | Rappel et al. | |
| 9,087,458 B2 | 7/2015 | Shim et al. | |
| 2001/0019818 A1 | 9/2001 | Yong | |
| 2002/0168619 A1 | 11/2002 | Provenza | |
| 2003/0031993 A1 | 2/2003 | Pugh | |
| 2004/0126746 A1 | 7/2004 | Toly | |
| 2004/0248072 A1 | 12/2004 | Gray et al. | |
| 2005/0008997 A1 | 1/2005 | Herman | |
| 2005/0026125 A1 | 2/2005 | Toly | |
| 2005/0084833 A1 | 4/2005 | Lacey et al. | |
| 2005/0142525 A1 | 6/2005 | Cotin et al. | |
| 2005/0196739 A1 | 9/2005 | Moriyama | |
| 2005/0196740 A1 | 9/2005 | Moriyama | |
| 2005/0214727 A1 | 9/2005 | Stoianovici et al. | |
| 2006/0046235 A1 | 3/2006 | Alexander et al. | |
| 2006/0252019 A1 | 11/2006 | Burkitt et al. | |
| 2006/0275741 A1 | 12/2006 | Chewning et al. | |
| 2007/0077544 A1 | 4/2007 | Lemperle et al. | |
| 2007/0148626 A1 | 6/2007 | Ikeda | |
| 2007/0166682 A1 | 7/2007 | Yarin et al. | |
| 2007/0275359 A1 | 11/2007 | Rotnes et al. | |
| 2008/0032272 A1 | 2/2008 | Palakodeti | |
| 2008/0032273 A1 | 2/2008 | Macnamara et al. | |
| 2008/0064017 A1 | 3/2008 | Grundmeyer, III | |
| 2008/0076101 A1 | 3/2008 | Hyde et al. | |
| 2008/0187895 A1 | 8/2008 | Sakezles | |
| 2008/0299529 A1 | 12/2008 | Schaller | |
| 2009/0068627 A1 | 3/2009 | Toly | |
| 2009/0142739 A1 | 6/2009 | Wang et al. | |
| 2009/0142741 A1 | 6/2009 | Ault et al. | |
| 2009/0176196 A1 | 7/2009 | Niblock et al. | |
| 2009/0187079 A1 | 7/2009 | Albrecht et al. | |
| 2009/0246747 A1 | 10/2009 | Buckman, Jr. | |
| 2010/0047752 A1 | 2/2010 | Chan et al. | |
| 2010/0099067 A1 | 4/2010 | Agro | |
| 2010/0167249 A1 | 7/2010 | Ryan | |
| 2010/0167250 A1 | 7/2010 | Ryan et al. | |
| 2010/0167253 A1 | 7/2010 | Ryan et al. | |
| 2010/0167254 A1 | 7/2010 | Nguyen | |
| 2010/0094730 A1 | 8/2010 | Di Betta et al. | |
| 2010/0196867 A1 | 8/2010 | Geerligs et al. | |
| 2010/0209899 A1 | 8/2010 | Park | |
| 2010/0273136 A1 | 10/2010 | Kandasami et al. | |
| 2010/0279263 A1 | 11/2010 | Duryea | |
| 2011/0091855 A1 | 4/2011 | Miyazaki | |
| 2011/0200976 A1 | 8/2011 | Hou et al. | |
| 2011/0207104 A1 | 8/2011 | Trotta | |
| 2011/0244436 A1 | 10/2011 | Campo | |
| 2011/0269109 A2 | 11/2011 | Miyazaki | |
| 2011/0281251 A1 | 11/2011 | Mousques | |
| 2012/0015339 A1 | 1/2012 | Hendrickson et al. | |
| 2012/0028231 A1 | 2/2012 | Misawa et al. | |
| 2012/0045743 A1 | 2/2012 | Okano et al. | |
| 2012/0082970 A1 * | 4/2012 | Pravong | G09B 23/30 434/262 |
| 2012/0100217 A1 | 4/2012 | Green et al. | |
| 2012/0115117 A1 | 5/2012 | Marshall | |
| 2012/0115118 A1 | 5/2012 | Marshall | |
| 2012/0148994 A1 | 6/2012 | Hori et al. | |
| 2012/0164616 A1 | 6/2012 | Endo et al. | |
| 2012/0165866 A1 | 6/2012 | Kaiser et al. | |
| 2012/0202180 A1 | 8/2012 | Stock et al. | |
| 2012/0264096 A1 | 10/2012 | Taylor et al. | |
| 2012/0282584 A1 | 11/2012 | Millon et al. | |
| 2012/0288839 A1 | 11/2012 | Crabtree | |
| 2012/0308977 A1 | 12/2012 | Tortola | |
| 2013/0101973 A1 | 4/2013 | Hoke et al. | |
| 2013/0157240 A1 | 6/2013 | Hart et al. | |
| 2013/0177890 A1 | 7/2013 | Sakezles | |
| 2013/0192741 A1 | 8/2013 | Trotta et al. | |
| 2013/0245681 A1 | 9/2013 | Straehnz et al. | |
| 2013/0288216 A1 | 10/2013 | Parry, Jr. et al. | |
| 2014/0011172 A1 | 1/2014 | Lowe | |
| 2014/0017651 A1 | 1/2014 | Sugimoto et al. | |
| 2014/0030682 A1 | 1/2014 | Thilenius | |
| 2014/0038151 A1 | 2/2014 | Hart | |
| 2014/0051049 A1 | 2/2014 | Jarc et al. | |
| 2014/0072941 A1 | 3/2014 | Hendrickson et al. | |
| 2014/0087345 A1 | 3/2014 | Breslin et al. | |
| 2014/0087346 A1 | 3/2014 | Breslin et al. | |
| 2014/0087347 A1 | 3/2014 | Tracy et al. | |
| 2014/0093852 A1 | 4/2014 | Poulsen et al. | |
| 2014/0093854 A1 | 4/2014 | Poulsen et al. | |
| 2014/0099858 A1 | 4/2014 | Hernandez | |
| 2014/0106328 A1 | 4/2014 | Loor | |
| 2014/0156002 A1 | 6/2014 | Thompson et al. | |
| 2014/0162016 A1 | 6/2014 | Matsui et al. | |
| 2014/0170623 A1 | 6/2014 | Jarstad et al. | |
| 2014/0212861 A1 | 7/2014 | Romano | |
| 2014/0220527 A1 | 8/2014 | Li et al. | |
| 2014/0220532 A1 | 8/2014 | Ghez et al. | |
| 2014/0242564 A1 | 8/2014 | Pravong et al. | |
| 2014/0248596 A1 | 9/2014 | Hart et al. | |
| 2014/0272878 A1 | 9/2014 | Shim et al. | |
| 2014/0272879 A1 | 9/2014 | Shim et al. | |
| 2014/0308643 A1 | 10/2014 | Trotta et al. | |
| 2014/0349266 A1 | 11/2014 | Choi | |
| 2014/0370477 A1 | 12/2014 | Black et al. | |
| 2015/0031008 A1 | 1/2015 | Black et al. | |
| 2015/0037773 A1 * | 2/2015 | Quirarte Catano | G09B 23/285 434/262 |
| 2015/0038613 A1 | 2/2015 | Sun et al. | |
| 2015/0086955 A1 | 3/2015 | Poniatowski et al. | |
| 2015/0132732 A1 | 5/2015 | Hart et al. | |
| 2015/0132733 A1 | 5/2015 | Garvik et al. | |
| 2015/0187229 A1 | 7/2015 | Wachli et al. | |
| 2015/0194075 A1 | 7/2015 | Rappel et al. | |
| 2015/0202299 A1 | 7/2015 | Burdick et al. | |

FOREIGN PATENT DOCUMENTS

| | | |
|---|---|---|
| CN | 2909427 Y | 6/2007 |
| CN | 201364679 Y | 12/2009 |
| CN | 201955979 U | 8/2011 |

(56) References Cited

FOREIGN PATENT DOCUMENTS

| | | |
|---|---|---|
| CN | 202443680 U | 9/2012 |
| CN | 202563792 U | 11/2012 |
| CN | 202601055 U | 12/2012 |
| CN | 202694651 U | 1/2013 |
| CN | 103050040 A | 4/2013 |
| CN | 203013103 U | 6/2013 |
| CN | 203038549 U | 7/2013 |
| CN | 203338651 U | 12/2013 |
| CN | 203397593 U | 1/2014 |
| CN | 203562128 U | 4/2014 |
| CN | 10388679 A | 6/2014 |
| DE | 91 02 218 U1 | 5/1991 |
| DE | 41 05 892 | 8/1992 |
| DE | 44 14 832 | 11/1995 |
| DE | 19716341 | 9/2000 |
| EP | 1 024 173 A1 | 8/2000 |
| FR | 2 691 826 | 12/1993 |
| FR | 2 917 876 | 12/2008 |
| GB | 2488994 A | 9/2012 |
| JP | 10 211160 | 8/1998 |
| JP | 2001005378 A | 1/2001 |
| JP | 2009236963 A | 10/2009 |
| JP | 2013127496 A | 6/2013 |
| MX | PA02004422 A | 11/2003 |
| PT | 106230 | 9/2013 |
| WO | WO 94/06109 | 3/1994 |
| WO | WO 96/42076 | 2/1996 |
| WO | WO 98/58358 | 12/1998 |
| WO | WO 99/01074 A1 | 1/1999 |
| WO | WO 00/36577 | 6/2000 |
| WO | WO 02/38039 A2 | 5/2002 |
| WO | WO 02/38039 A3 | 5/2002 |
| WO | WO 2004/032095 | 4/2004 |
| WO | WO 2005/071639 A1 | 8/2005 |
| WO | WO 2007/068360 | 6/2007 |
| WO | WO 2008/021720 A2 | 2/2008 |
| WO | WO 2009/000939 | 12/2008 |
| WO | WO 2010/094730 | 8/2010 |
| WO | WO 2011/151304 A1 | 12/2011 |
| WO | WO 2012168287 A1 | 12/2012 |
| WO | WO 2012175993 | 12/2012 |
| WO | WO 2013/048978 A1 | 4/2013 |
| WO | WO 2014/022815 A1 | 2/2014 |

OTHER PUBLICATIONS

European Patent Office, The International Search Report and Written Opinion for International Application No. PCT/US2012/60997, mailed Mar. 7, 2013, entitled "Simulated Tissue Structure for Surgical Training".

European Patent Office, The International Search Report and Written Opinion for International Application No. PCT/US2012/070971, mailed Mar. 18, 2013, entitled "Advanced Surgical Simulation".

Human Patient Simulator, Medical Education Technologies, Inc., http://www.meti.com (1999) all.

The International Bureau of WIPO, International Preliminary Report on Patentability for International Application No. PCT/US2011/053859, titled "Portable Laparoscopic Trainer" dated Apr. 2, 2013.

European Patent Office, The International Search Report and Written Opinion for International Application No. PCT/US2013/062363, mailed Jan. 22, 2014, entitled "Surgical Training Model for Laparoscopic Procedures".

European Patent Office, The International Search Report and Written Opinion for International Application No. PCT/US2013/061949, mailed Feb. 17, 2014, entitled "Surgical Training Model for Laparoscopic Procedures".

Anonymous: Realsim Systems—LTS2000, Sep. 4, 2005, pp. 1-2, XP055096193, Retrieved from the Internet: URL:https://web.archive.org/web/2005090403; 3030/http://www.realsimsystems.com/exersizes.htm (retrieved on Jan. 14, 2014).

European Patent Office, The International Search Report and Written Opinion for International Application No. PCT/US2013/062269, mailed Feb. 17, 2014, entitled "Surgical Training Model for Transluminal Procedures".

European Patent Office, The International Search Report and Written Opinion for International Application No. PCT/US2013/061557, mailed Feb. 10, 2014, entitled "Surgical Training Model for Laparoscopic Procedures".

European Patent Office, The International Search Report and Written Opinion for International Application No. PCT/US2013/061728 mailed Oct. 18, 2013, entitled "Surgical Training Model for Laparoscopic Procedures".

Limps and Things, EP Guildford MATTU Hernia Trainer, http://limbsandthings.com/us/products/tep-guildford-mattu-hernia-trainer/.

Simulab, Hernia Model, http://www.simulab.com/product/surgery/open/hernia-model.

McGill Laparoscopic Inguinal Hernia Simulator, Novel Low-Cost Simulator for Laparoscopic Inguinal Hernia Repair.

University of Wisconsin-Madison Biomedical Engineering, Inguinal Hernia Model, http://bmedesign.engr.wisc.edu/projects/s10/hernia_model/.

The International Bureau of WIPO, International Preliminary Report on Patentability for International Application No. PCT/US2012/070971, titled "Advanced Surgical Simulation" dated Jun. 24, 2014.

The International Bureau of WIPO, International Preliminary Report on Patentability for International Application No. PCT/US2012/060997, titled "Simulated Tissue Structure for Surgical Training" dated Apr. 22, 2014.

European Patent Office, The International Search Report and Written Opinion for International Application No. PCT/US2014/019840 mailed Jul. 4, 2014 entitled "Advanced Surgical Simulation Constructions and Methods".

European Patent Office, The International Search Report and Written Opinion for International Application No. PCT/US2014/048027, titled "First Entry Model" mailed Oct. 17, 2014.

European Patent Office, The International Search Report and Written Opinion of the International Searching Authority for International Application No. PCT/US2014/038195 titled "Hernia Model", mailed Oct. 15, 2014.

European Patent Office, The International Search Report and Written Opinion for International Application No. PCT/US2014/042998, title; Gallbladder Model, mailed Jan. 7, 2015.

The International Bureau of WIPO, International Preliminary Report on Patentability, for PCT application No. PCT/US2013/053497, titled, Simulated Stapling and Energy Based Ligation for Surgical Training, mailed Feb. 12, 2015.

The International Bureau of WIPO, International Preliminary Report on Patentability for international application No. PCT/US2013/061728, titled Surgical Training Model for Laparoscopic Procedures, mailed Apr. 9, 2015.

The International Bureau of WIPO, International Preliminary Report on Patentability for International Application No. PCT/US2013/062363, titled Surgical Training Model for Laparoscopic Procedures, mailed Apr. 9, 2015.

The International Bureau of WIPO, International Preliminary Report on Patentability for International Application No. PCT/US2013/062269, titled Surgical Training Model for Laparoscopic Procedures, mailed Apr. 9, 2015.

The International Bureau of WIPO, International Preliminary Report on Patentability for International Application No. PCT/US2013/061557, titled Surgical Training Model for Laparoscopic Procedures, mailed Apr. 9, 2015.

The International Bureau of WIPO, International Preliminary Report on Patentability for International Application No. PCT/US2013/061949, titled Surgical Training Model for Laparoscopic Procedures, mailed Apr. 9, 2015.

European Patent Office, The International Search Report and Written Opinion for International Application No. PCT/US2015/020574, titled "Advanced First Entry Model for Surgical Simulation," mailed Jun. 1, 2015.

(56) References Cited

OTHER PUBLICATIONS

European Patent Office, The International Search Report and Written Opinion for International Application No. PCT/US2015/022774, mailed Jun. 11, 2015 entitled "Simulated Dissectible Tissue."

Kurashima Y et al, "A tool for training and evaluation of Laparoscopic inguinal hernia repair; the Global Operative Assessment of Laparoscopic Skills-Groin Hernia" American Journal of Surgery, Paul Hoeber, New York, NY, US vol. 201, No. 1, Jan. 1, 2011, pp. 54-61 XP027558745.

Lamouche, Guy, et al., "Review of tissue simulating phantoms with controllable optical, mechanical and structural properties for use in optical coherence tomography," Biomedical Optics Express, vol. 3, No. 6, Jun. 1, 2012 (18 pgs.).

Anonymous: Silicone Rubber—from Wikipedia, the free encyclopedia, Feb. 21, 2014, pp. 1-6.

European Patent Office, International Search Report and Written Opinion for International Application No. PCT/US2013/053497 titled "Simulated Stapling and Energy Based Ligation for Surgical Training" dated Nov. 5, 2013.

The International Bureau of WIPO, International Preliminary Report on Patentability for International Application No. PCT/US2014/019840, titled Simulated Tissue Structure for Surgical Training, mailed Sep. 11, 2015.

The International Bureau of WIPO, International Preliminary Report on Patentability for International Application No. PCT/US2014/038195, titled Hernia Model, mailed Nov. 26, 2015.

The International Bureau of WIPO, International Preliminary Report on Patentability for International Application No. PCT/US2014/042998, titled "Gallbladder Model" dated Dec. 30, 2015.

The International Bureau of WIPO, International Preliminary Report on Patentability for International Application No. PCT/US2014/048027, titled "First Entry Model" dated Feb. 4, 2016.

\* cited by examiner

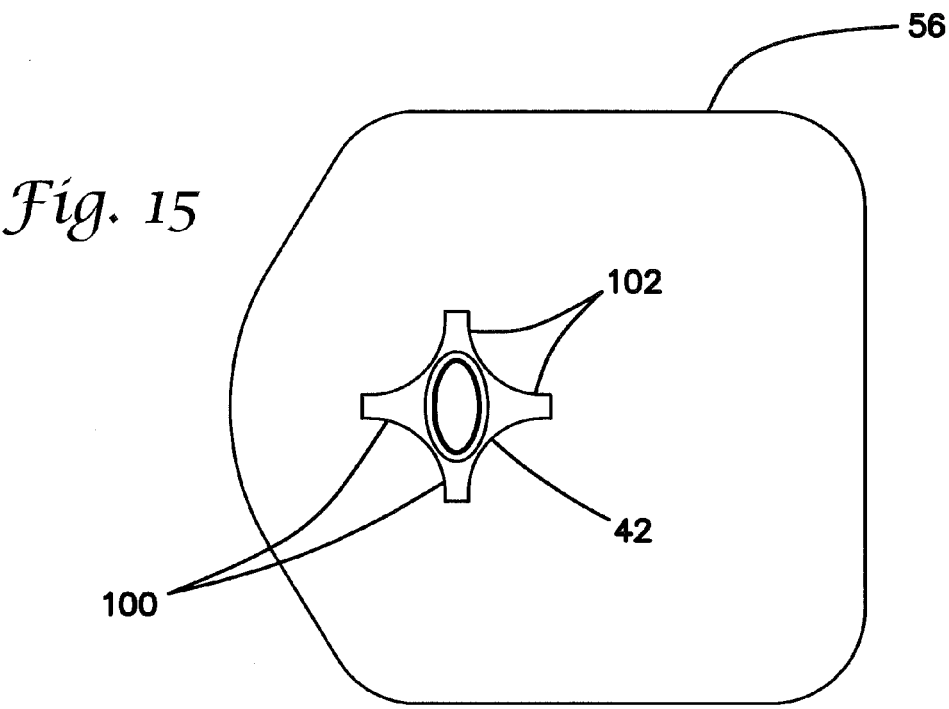
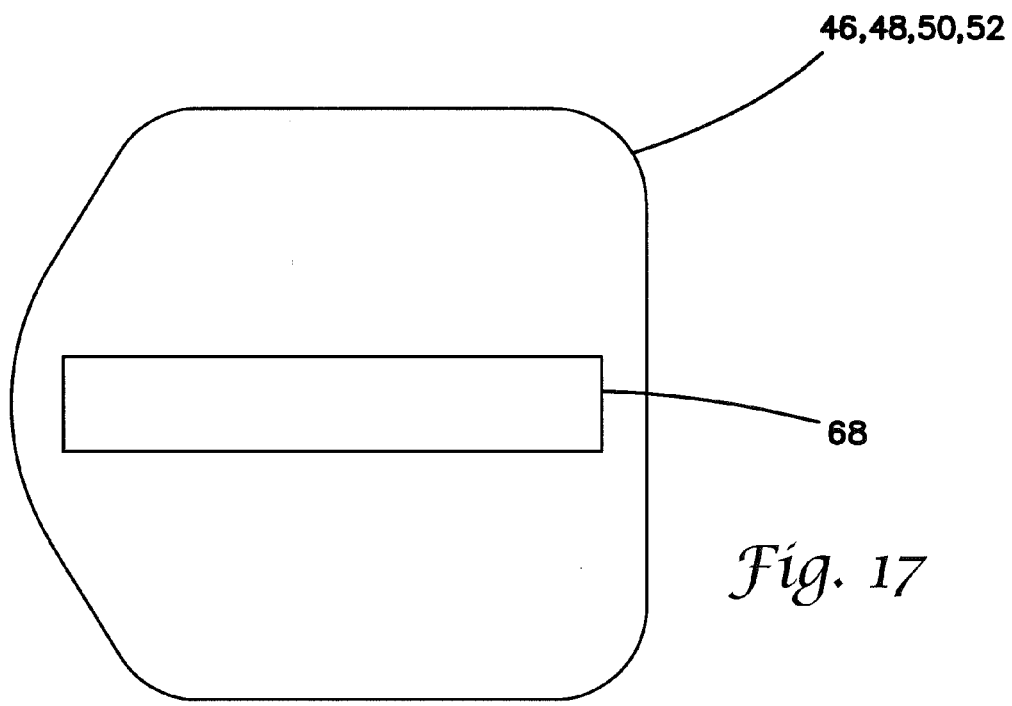

FIRST ENTRY MODEL

CROSS-REFERENCE TO RELATED APPLICATIONS

This application claims priority to and benefit of U.S. Provisional Patent Application Ser. No. 61/857,982 filed on Jul. 24, 2013 entitled "First entry model" and U.S. Provisional Patent Application Ser. No. 61/971,714 filed on Mar. 28, 2014 entitled "First entry model" both of which are incorporated herein by reference in their entireties.

FIELD OF THE INVENTION

This application relates to surgical training tools, and in particular, to simulated tissue structures and models for teaching and practicing surgical procedures.

BACKGROUND OF THE INVENTION

Laparoscopic surgery requires several small incisions in the abdomen for the insertion of trocars or small cylindrical tubes approximately 5 to 10 millimeters in diameter through which surgical instruments and a laparoscope are placed into the abdominal cavity. The laparoscope illuminates the surgical field and sends a magnified image from inside the body to a video monitor giving the surgeon a close-up view of the organs and tissues. The surgeon watches the live video feed and performs the operation by manipulating the surgical instruments placed through the trocars.

The first step in laparoscopic surgery is to make a small incision to access and create pneumoperitoneum. Pneumoperitoneum is the insufflation of the abdominal cavity with carbon dioxide gas. Insufflation with gas creates a working space in the abdomen necessary for laparoscopy. Once a proper working space has been created, surgical instruments can be inserted for performing a laparoscopic procedure. This process of penetrating the abdomen and creating pneumoperitoneum prior to insertion of other instruments is called first entry. There are many different ways to achieve pneumoperitoneum. One option is using a Veress needle. A Veress needle is approximately 12-15 centimeters long with a diameter of approximately 2 millimeters. The surgeon inserts the spring-loaded needle into the abdomen of the patient after making a small incision. When the needle breaches the inner abdominal space, the spring-loaded inner stylet springs forward to cover the sharp needle in order protect internal organs. The surgeon relies on the tactile feedback of the needle and spring for proper placement. Once proper entry is confirmed, carbon dioxide is introduced through the Veress needle and into the abdominal cavity of the patient expanding the abdomen to creating a working space.

Another option is a Hasson technique or cut down technique in which the surgeon makes an initial incision at the umbilicus and the tissue is bluntly dissected. A suture is placed on either side of the incision into the fascia layer to help hold the device in place. The supraperitoneal tissue is dissected away and the peritoneum is incised to enter the abdominal cavity. At this point, a Hasson trocar is inserted into the incision. The Hasson trocar has a blunt tip with suture ties and/or a balloon to hold it in place. After the trocar is placed into the incision, the device is secured with sutures and/or the balloon and carbon dioxide gas is pumped into the patient through the trocar to achieve pneumoperitoneum.

Another option is direct trocar entry. In this option, the surgeon uses a bladed or non-bladed trocar either optically or non-optically. The trocar is placed through the layers of the abdominal wall after the initial skin incision is made. When used optically, a camera is inserted into the trocar before entry. After the initial incision is made, the trocar is placed through the layers of the abdomen. Since the camera is present, all of the layers of the abdominal wall can be observed during penetration. Once the surgeon sees that he or she has broken through the peritoneum, penetration can halt, the obturator tip of the trocar pulled back slightly or removed entirely and insufflation can commence by pumping carbon dioxide gas in through the cannula to create pneumoperitoneum.

Another option involves a specialized first entry trocar such as the FIOS® first entry trocar made by Applied Medical Resources Corporation in California. Like optical direct trocar entry, a camera is inserted into the FIOS® trocar and the abdominal wall layers are observed during insertion into the abdominal cavity. The specialized FIOS® trocar has a small vent hole in the tip such that instead of requiring that the obturator of the trocar be pulled back or removed completely to introduce carbon dioxide through the cannula, carbon dioxide gas is introduced through the small vent hole in the tip of the obturator with the camera in place. Because carbon dioxide can be introduced through the tip, the FIOS® trocar does not have to penetrate as deeply into the abdominal cavity as a traditional trocar, thereby, affording internal organs greater protection before insufflation can commence. Also, because the obturator does not have to be pulled back or removed, observation via the inserted camera can take place at the point of insufflation.

In addition to the above options for entering the abdominal cavity, generally, there are two common places on the abdomen that a surgeon must know how to enter. The most widely used location for first entry is the umbilicus. The umbilicus is a natural weakening in the abdomen where the umbilical cord was attached in the womb. In this part of the abdomen, there are no rectus muscles, arteries or veins so it is generally easier to reach the abdominal cavity. Additionally, the umbilicus is typically an easy place to hide a scar. When surgeons use the umbilicus as an entry site, particularly for the Hasson technique, clamps are often used to grab the base of the umbilicus and the umbilicus is inverted. At this point, an incision is made and the surgeon cuts down as desired and inserts the trocar or Veress needle. With optical entry, the surgeon is able to see all the layers of the abdominal wall. In this location of penetration, they are able to see the fatty tissue, linea alba, transversalis fascia and, finally, the peritoneum. Additionally, when entering at the umbilicus, the umbilical stalk should also be visible. The stalk is what remains of the umbilical cord and it stretches from the skin making up the umbilicus to the peritoneal layer.

If a patient has had a previous surgery and adhesions are suspected or a hernia is present at the site of the umbilicus, first entry may need to occur at another location. In this case, the surgeon will often enter from the left upper quadrant since there is less chance of damaging a vital organ in this location. The left upper quadrant is different from the umbilicus region in that there are muscle layers. The rectus abdominus muscles run parallel with the patient's abdomen and are found on either side of the patient's midline. Underneath the rectus abdominus muscles run the inferior epigastric veins and arteries which the surgeon must be careful to avoid. When a surgeon is entering the upper quadrant of the abdominal cavity optically, he or she is able to see the skin, fatty tissue, anterior rectus sheath, rectus abdominus, the epigastric vein, which runs through the posterior rectus sheath, and finally, the peritoneum. If the left upper quadrant is not an ideal position for a port, the surgeon may choose to enter at another location such as sub-xiphoid where subcutaneous fat, rectus sheath and peritoneum are present.

Since there are many options for first entry, it is important that surgeons have a way to learn and practice the various techniques. There is a need for an anatomical model of the umbilical region and surrounding abdomen that is anatomically correct and includes all the layers of the abdominal wall as well as the veins and arteries that run through the wall. Not only does the model have to be anatomically correct, but also, the model must provide a realistic aural and tactile sensation. For example, when using a Veress needle, two pops are generally felt as the surgeon pushes the needle through the abdominal wall. For optical entry, the surgeon needs to view all of the appropriate tissue layers in the abdominal wall. For entry through the umbilicus, the surgeon must be able to grasp and invert the umbilicus. Also, the model must be able to be used with all four first entry techniques and at multiple (umbilical and upper left quadrant at minimum) entry sites.

SUMMARY OF THE INVENTION

According to one aspect of the invention, a simulated tissue structure is provided. The simulated tissue structure includes a support and an artificial anatomical portion. The artificial anatomical portion is configured to simulate a region of an abdominal wall. The anatomical portion is connected to the support such that the anatomical portion is penetrable from a first side to a second side of the anatomical portion. The anatomical portion includes a plurality of simulated tissue layers arranged in juxtaposition with each other. The simulated tissue layers include a simulated skin layer located above the remaining layers. Each of the remaining layers has an opening extending through the layer. The simulated skin layer has a top surface and a bottom surface. The top surface of the simulated skin layer defines a first side of the anatomical portion. The anatomical portion includes a tubular structure having a proximal end and a distal opening at a distal end. The distal end of the tubular extends through one or more of the openings in the remaining layers. In one variation, the proximal end of the tubular structure is connected to the simulated skin layer. The anatomical portion further includes a simulated peritoneum layer having a top surface and a bottom surface. The bottom surface of the simulated peritoneum layer forms the second side of the anatomical portion. The anatomical portion further includes a first layer having a top surface and a bottom surface. The bottom surface of the first layer overlays the top surface of the simulated peritoneum layer. The anatomical portion includes a second layer having a top surface and a bottom surface and the bottom surface of the second layer overlays the top surface of the first layer. The anatomical portion further includes a third layer having a top surface and a bottom surface. The bottom surface of the skin layer overlays the top surface of the third layer. The first layer is made of closed cell polyethylene foam. The second layer is made of fibrous material. The third layer is made of memory polyurethane foam.

According to another aspect of the invention, a surgical simulation system is provided. The system includes an abdominal wall model. The model includes a support and an artificial anatomical portion. The artificial anatomical portion is configured to simulate a region of an abdominal wall. The anatomical portion is connected to the support such that the anatomical portion is penetrable from a first side to a second side of the anatomical portion. The anatomical portion includes a plurality of simulated tissue layers arranged in juxtaposition with each other. The simulated tissue layers including a simulated skin layer located above the remaining layers. The simulated skin layer has a top surface and a bottom surface. The top surface of the simulated skin layer defines a first side of the anatomical portion. The surgical simulation system includes a trainer. The trainer includes a base and a top cover having a top surface and a bottom surface. The top cover is connected to and spaced apart from the base to define an internal cavity between the top cover and the base. The top cover has a first opening and the abdominal wall model is removably located inside the first opening. The model is connected to the top cover such that penetration of the anatomical portion provides access to the internal cavity of the trainer.

According to another aspect of the invention, a simulated tissue structure configured to simulate an abdominal wall is provided. The simulated abdominal wall structure includes a simulated skin layer having a top surface and a bottom surface. The simulated abdominal wall structure includes a simulated fat layer having a top surface and a bottom surface. The bottom surface of the simulated skin layer overlays the top surface of the simulated fat layer. A first simulated muscle layer having a top surface and a bottom surface is included. A second simulated muscle layer having a top surface and a bottom surface is included. The simulated abdominal wall structure further includes a third layer having a top surface and a bottom surface. The third layer is located between the first and second simulated muscle layers. A fourth layer having a top surface and a bottom surface is provided. A fifth layer having a top surface and a bottom surface is also included. The bottom surface of the fourth layer overlays the top surface of the fifth layer. The simulated abdominal wall structure includes a simulated peritoneum layer having a top surface and a bottom surface. The bottom surface of the fifth layer overlays the top surface of the simulated peritoneum layer. The fourth layer is made of fabric. The simulated fat layer is made of polyurethane memory foam. The simulated skin layer is made of silicone. The third and fifth layers are made of closed cell polyethylene foam.

According to another aspect of the invention, a simulated tissue structure is provided. The simulated tissue structure includes a support and an artificial anatomical portion. The support includes a top frame defining a top opening and a bottom frame defining a bottom opening. The artificial anatomical portion is configured to simulate a region of an abdominal wall. The artificial anatomical portion is connected to the support between the top frame and the bottom frame such that the anatomical portion is penetrable through the top opening and bottom opening. The anatomical portion includes a first layer having a top surface and a bottom surface and a second layer having a top surface and a bottom surface. The second layer has a second opening and the bottom surface of the first layer overlays the top surface of the second layer. The anatomical portion includes third layer having a top surface and a bottom surface. The third layer has a third opening or gap and the bottom surface of the second layer overlays the top surface of the third layer. A fourth layer having a top surface and a bottom surface is provided. The fourth layer has a fourth opening or gap and the bottom surface of the third layer overlays the top surface of the fourth layer. A fifth layer having a top surface and a bottom surface is provided. The fifth layer has a fifth opening or gap and the bottom surface of the fourth layer overlays the top surface of the fifth layer. A sixth layer having a top surface and a bottom surface is provided. The sixth layer has a sixth opening or gap and the bottom surface of the fifth layer overlays the top surface of the sixth layer. A seventh layer having a top surface and a bottom surface is provided. The seventh layer has a seventh opening and the bottom surface of the sixth layer overlays the top surface of the seventh layer. An eighth layer having a top surface and a bottom surface is provided. The eighth layer has an eighth opening and the eighth layer is located under the seventh layer. A ninth layer having a top surface and a bottom surface is provided. The ninth layer has a ninth opening and the bottom surface of the eighth layer overlays the top surface of the ninth layer. The third opening/gap, fourth opening/gap, fifth opening/gap and sixth opening/gap are elongate substantially in alignment with each other when the layers are overlayed and have a width and length that extends along a longitudinal axis. The second opening, seventh opening, eighth opening and ninth opening are substantially in alignment with each other and smaller than the elongate openings/gaps of the third opening/gap, fourth opening/gap, fifth opening/gap and sixth opening/gap. All of the openings/gaps overlap at least in part to provide passage of a simulated umbilicus.

According to another aspect of the invention, a method for manufacturing a simulated skin layer for a simulated abdominal wall is provided. A mold is provided. The mold includes a cavity having a first depth and a first well inside the cavity having a second depth greater than the first depth. A core is located inside the first well. A silicone mixture is poured into the mold cavity and first well. The silicone is cured inside the mold to form an artificial skin layer having a top surface and a bottom surface and a tubular structure extending from the top surface. The tubular structure is formed with a lumen that defines an opening in the layer at the proximal end and an opening at a distal end. The tubular structure is inverted by passing the distal end of the tubular structure through the opening. A thicker portion is formed around the first well. The opening at the proximal end of the tubular structure is sealed closed with adhesive to simulate an umbilicus.

According to one aspect of the invention, a model that allows users to practice first entry surgical procedures is provided. The first entry model includes an anatomical portion connected to a support. The anatomical portion includes a plurality of anatomical layers that is captured between two frame elements which can attach to a laparoscopic trainer.

BRIEF DESCRIPTION OF THE DRAWINGS

FIG. 15 is a bottom planar view of a transversalis fascia layer and umbilical stalk according to the present invention.

FIG. 17 is a top planar view that is representative of more than one layer in an anatomical portion of a first entry model according to the present invention.

DETAILED DESCRIPTION OF THE INVENTION

Figure 1:
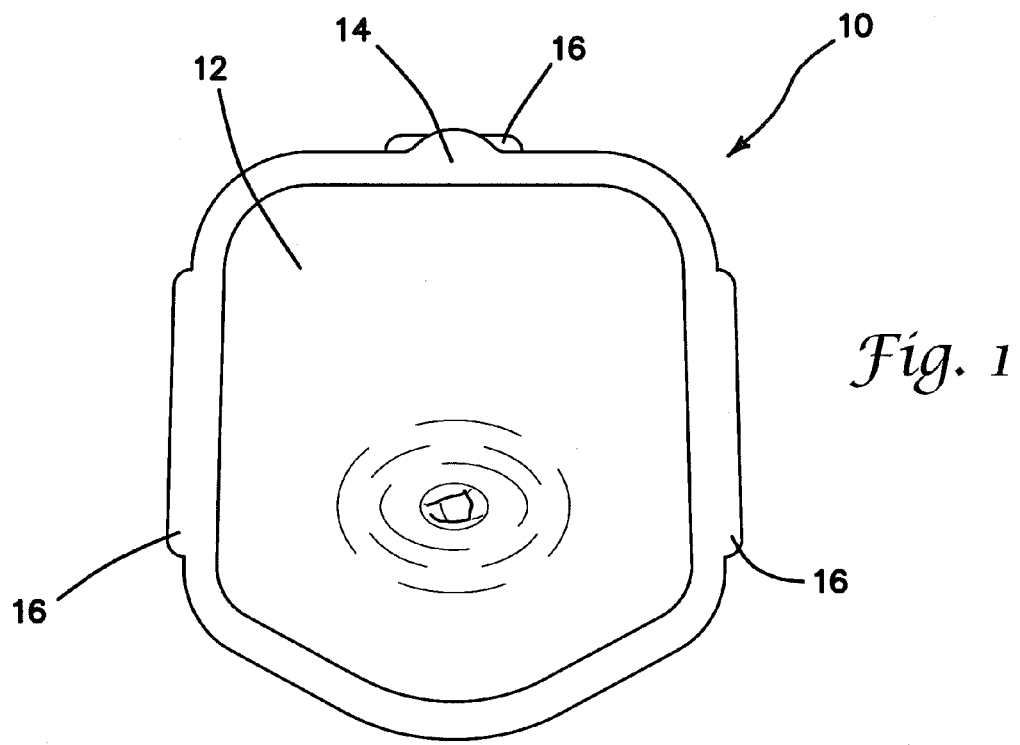
FIG. 1 is a top perspective view of a first entry model according to the present invention.
Figure 2:
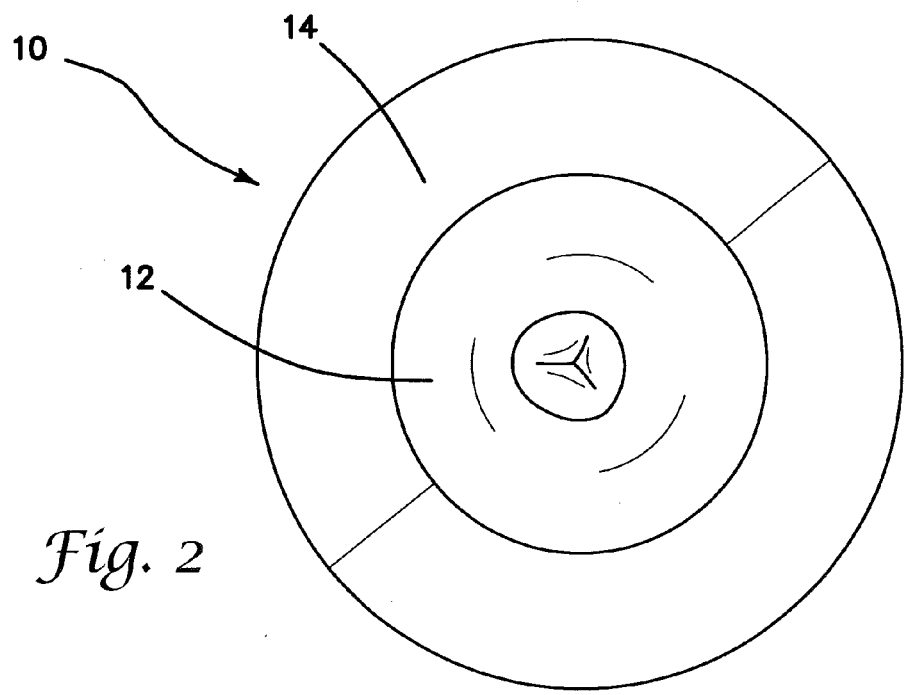
FIG. 2 is top perspective view of a first entry model according to the present invention.

Turning now to FIG. 1, there is shown a model 10 of an abdominal region that includes the umbilicus for practicing surgical first entry into the abdominal cavity for performing laparoscopic surgical procedures. Throughout this specification the model 10 will be referred to as the first entry model 10. The model 10 includes an anatomical portion 12 connected to a support 14 to form a substantially planar configuration. The support 14 is a frame that encompasses and connects to the perimeter of the anatomical portion 12 and holds the anatomical portion 12 together. In particular, the support 14 includes a top frame and a bottom frame made of plastic material sufficiently rigid to provide structural support and maintain the planar shape of the model 10 and permit the center-located anatomical portion to be penetrated from one side to the other. In one variation, the model 10 is slightly curved to mimic an outwardly curved abdomen. The top frame and the bottom frame connect together capturing the perimeter of the anatomical portion 12 between the top and bottom frames. The model 10 in FIG. 1 is polygonal having five sides forming a slightly elongated shape wherein one side is curved outwardly in a generally U-shaped configuration. A model 10 having a circular support 14 that frames a circular anatomical portion 12 is shown in FIG. 2. The model 10 can be any shape. The frame 14 includes connecting elements 16 configured for connecting the model 10 to a larger laparoscopic trainer 20 as shown in FIG. 3.

Figure 3:
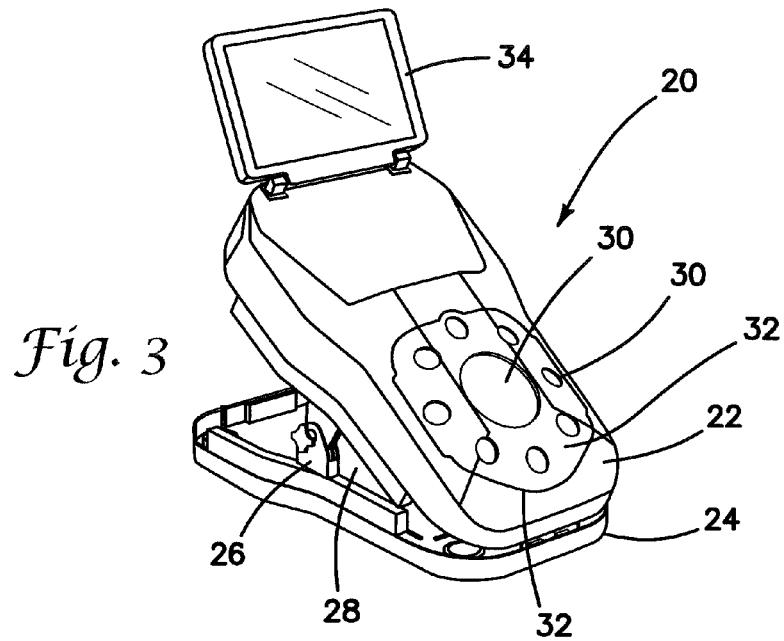
FIG. 3 is a top perspective view of a laparoscopic trainer for use with a first entry model according to the present invention.

Turning now to FIG. 3, a laparoscopic trainer 20 includes a top cover 22 connected to a base 24 by a pair of legs 26 spacing the top cover 22 from the base 24. The laparoscopic trainer 20 is configured to mimic the torso of a patient such as the abdominal region. The top cover 22 is representative of the anterior surface of the patient and a space 28 defined between the top cover 22 and the base 24 is representative of an interior of the patient or body cavity where organs reside. The laparoscopic trainer 20 is a useful tool for teaching, practicing and demonstrating various surgical procedures and their related instruments in simulation of a patient. When assembled, the top cover 22 is positioned directly above the base 24 with the legs 26 located substantially at the periphery and interconnected between the top cover 22 and base 24 The top cover 22 and base 24 are substantially the same shape and size and have substantially the same peripheral outline. The laparoscopic trainer 20 includes a top cover 22 that angulates with respect to the base 24. The legs 26 are configured to permit the angle of the top cover 22 with respect to the base 24 to be adjusted. FIG. 3 illustrates the trainer 20 adjusted to an angulation of approximately 30-45 degrees with respect to the base 24. A laparoscopic trainer 20 is described in co-pending U.S. patent application Ser. No. 13/248,449 entitled "Portable laparoscopic trainer" and filed on Sep. 29, 2011 by Pravong et al. to Applied Medical Resources Corporation and published as U.S. Patent Application Publication No. 2012/0082970, hereby incorporated by reference in its entirety herein.

For practicing various surgical techniques, surgical instruments are inserted into the cavity 28 of the laparoscopic trainer 20 through pre-established apertures 30 in the top cover 22. These pre-established apertures 30 may include seals that simulate trocars or may include simulated tissue that simulates the patient's skin and abdominal wall portions. For example, the circular first entry model 10 depicted in FIG. 2 is connected to the top cover 22 in the location of the central circular aperture 30 that has a conforming circular shape. The top cover 22 of the laparoscopic trainer 20 is configured with a removable insert 32 that is replaceable with the first entry model 10 depicted in FIG. 1. The insert 32, which is provided with apertures 30, has a shape that conforms to an opening in the top cover 22. When the insert 32 is removed, the first entry model 10, such as the one depicted in FIG. 1, having a conforming shape is inserted into the opening in the top cover 20 and the connecting elements 16 on the first entry model 10 aid in securing the model 10 to the trainer 20.

Various tools and techniques may be used to penetrate the top cover 20 as described in the background of this description to perform mock procedures not only on the model 10 but also on additional model organs placed between the top cover 22 and the base 24. When placed inside the cavity 28 of the trainer 20, an organ model is generally obscured from the perspective of the user who can then practice performing surgical techniques laparoscopically by viewing the surgical site indirectly via a video feed displayed on a video monitor 34. The video display monitor 34 is hinged to the top cover 22 and is shown in an open orientation in FIG. 3. The video monitor 34 is connectable to a variety of visual systems for delivering an image to the monitor 34. For example, a laparoscope inserted through one of the pre-established apertures 30 or a webcam located in the cavity 28 and used to observe the simulated procedure can be connected to the video monitor 34 and/or a mobile computing device to provide an image to the user. After first entry procedures are practiced on a first entry model 10 connected to the trainer 20, the first entry model 10 is removed and may be replaced with a new insert or reconstructed and reconnected to the trainer 20 to allow training to continue or be repeated. Of course, the first entry model 10 may be employed independently of the trainer 20 for practicing first entry techniques.

Figure 4:
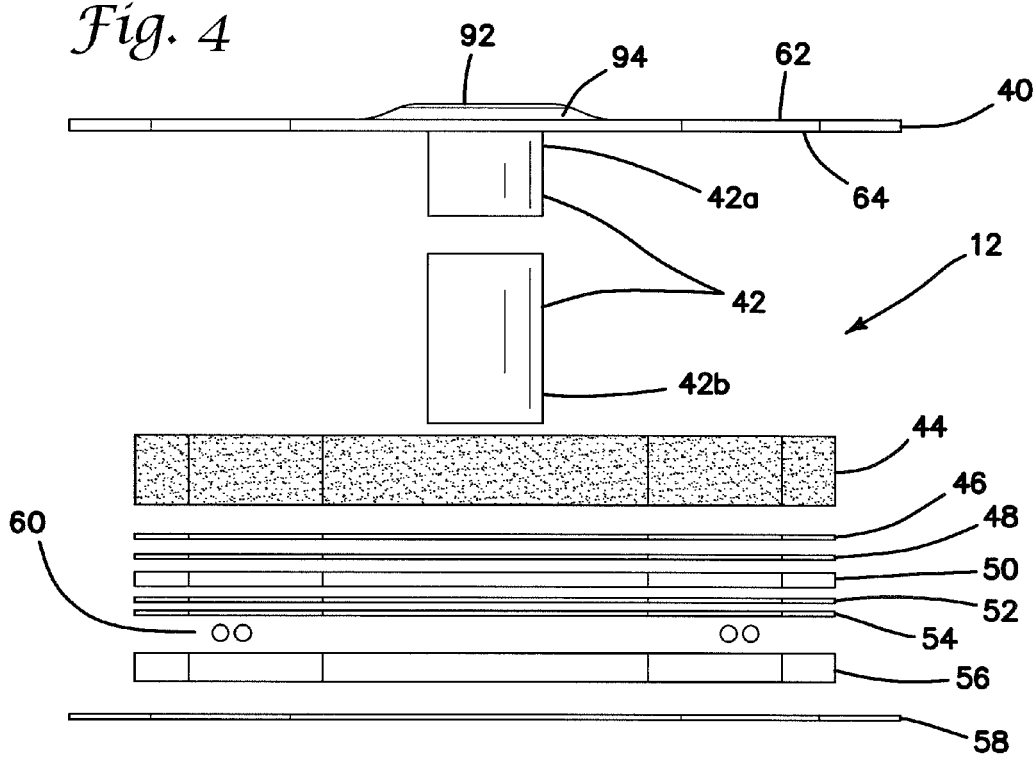
FIG. 4 is a side, exploded view of an anatomical portion of a first entry model according to the present invention.
Figure 5:
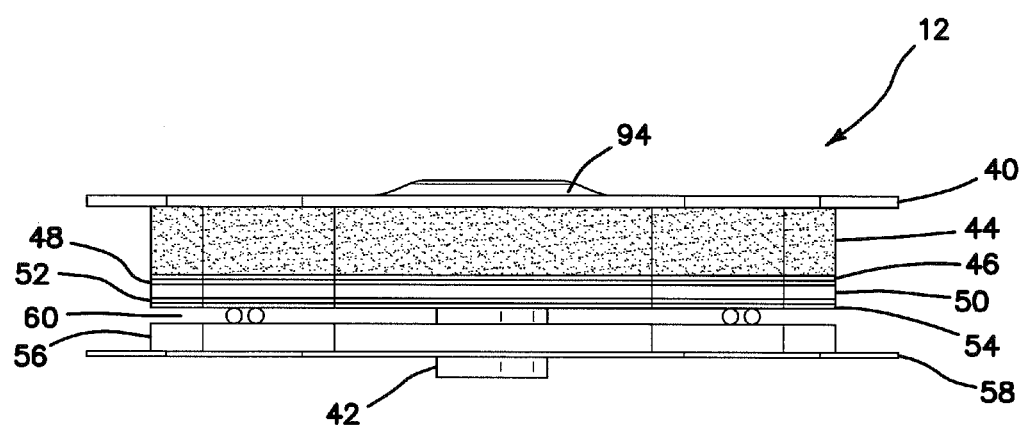
FIG. 5 is a side view of an anatomical portion of a first entry model according to the present invention.
Figure 6:
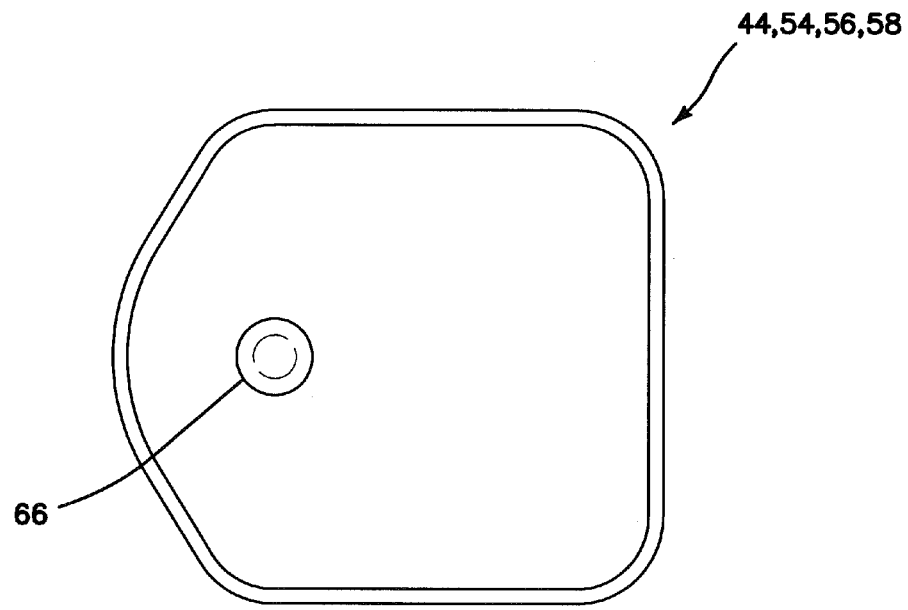
FIG. 6 is a top planar view that is representative of more than one layer in an anatomical portion of a first entry model according to the present invention.

Turning now to FIGS. 4 and 5, the anatomical portion 12 of the first entry model 10 made of artificial material will now be described. The anatomical portion 12 includes a skin layer 40, an umbilical stalk 42, a fat layer 44, an anterior rectus sheath layer 46, a first rectus muscle layer 48, a second rectus muscle layer 50, a third rectus muscle layer 52, a posterior rectus sheath layer 54, a transversalis fascia layer 56, and a peritoneum layer 58. The layers 40, 44, 46, 48, 50, 52, 54, 56, 58 are placed one on top of the other as shown in FIGS. 5-6 with the umbilical stalk 42 penetrating through all of the layers beneath the skin layer 40. The layers 40, 44, 46, 48, 50, 52, 54, 56, 58 are connected together with adhesive or other fastener. In one variation, the layers 40, 44, 46, 48, 50, 52, 54, 56 are connected with at least one price-tag holder punched through the layers and sandwiched between the skin layer 40 and the peritoneum layer 58 before being attached to the frame 14. In another variation, the layers are held together without adhesive or other fastener and are clamped between the top frame and bottom frame. An optional inferior epigastric vein and artery layer 60 is included between the posterior rectus sheath layer 54 and the transversalis fascia layer 56 as shown in FIGS. 4-5.

With continued reference to FIG. 4, the skin layer 40 is molded of silicone or thermoplastic elastomer dyed with a flesh color. The skin layer 40 includes a top surface 62 and bottom surface 64 defining a thickness of approximately 0.1 inches. The skin layer 40 includes an integrally formed umbilical stalk portion 42a. The skin layer 40 will be described in greater detail below.

Still referencing FIG. 4, the fat layer 44 is made of cellular polyethylene foam having a yellow color. The cellular foam layer is not solid but textured with air bubbles. The fat layer 44 is approximately 0.625 inches thick. The anterior rectus sheath layer 46 is made of solid ethylene vinyl acetate (EVA) foam having a white color and is approximately 1 millimeter thick. The first rectus muscle layer 48 is made of solid EVA foam and is red in color and approximately 1 millimeter thick. The second rectus muscle layer 50 is made of cellular polyethylene foam having a pink color. The second rectus muscle layer 50 is cellular foam that includes air bubbles that provide a cellular texture and is approximately 0.125 inches thick. The third rectus muscle layer 52 is made of solid EVA foam having a red color and is approximately 1 millimeter thick. The posterior rectus sheath layer 54 is made of solid EVA foam that is white in color and is approximately 1 millimeter thick. The transversalis fascia layer 56 is made of cellular polyethylene foam that is white in color and approximately 0.25 inches thick. The fascia layer 56 has a cellular texture arising from the cellular polyethylene foam as opposed to the solid EVA foam layers. The peritoneum layer 58 is made of solid EVA foam that is white in color and approximately 1 millimeter thick. The inferior epigastric vein and artery layer 60 layer include solid or hollow elongate cylindrical structures made of silicone or Kraton® polymer or other elastomer having a cross-sectional diameter of approximately 0.15 inches. The arteries are red in color and the veins are blue in color. The layers as described above provide an optical entry with a very realistic appearance to the end user. Cellular polyethylene foam is also called closed cell polyethylene foam.

Turning now to FIG. 6, there is shown a top planar view that is representative of the fat layer 44, the posterior rectus sheath layer 54, the transversalis fascia layer 56 and the peritoneum layer 58. These layers are approximately six inches wide and six and a half inches long. The fat layer 44, the posterior rectus sheath layer 54, the transversalis fascia layer 56 and the peritoneum layer 58 all have a circular aperture 66 that is approximately one inch in diameter. The aperture 66 is located approximately two inches from one side and is in the same place in all of these layers 44, 54, 56, 58 such that when overlaid the apertures 66 line up to provide a pathway for the umbilical stalk 42 across these layers.

Figure 7:
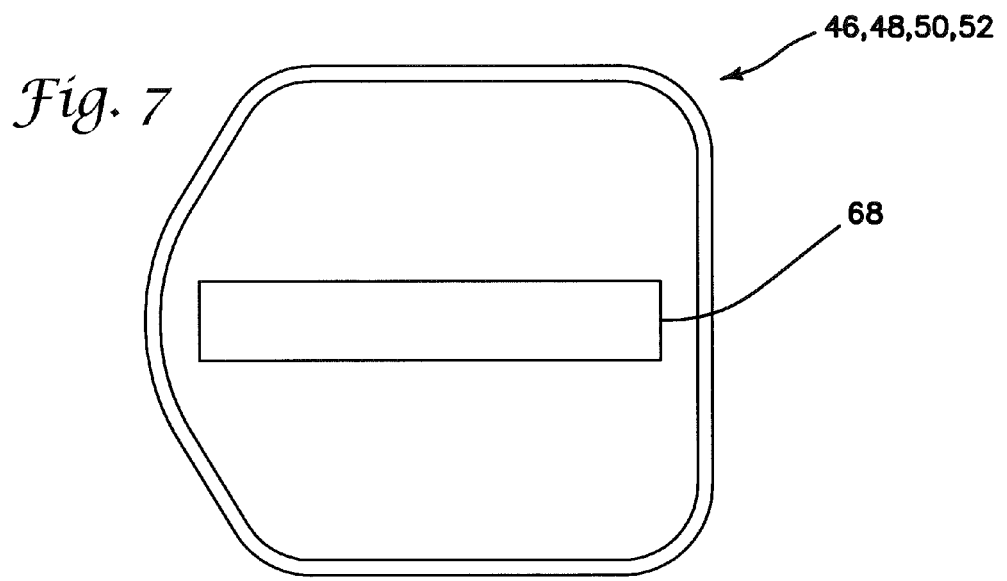
FIG. 7 is a top planar view that is representative of more than one layer in an anatomical portion of a first entry model according to the present invention.

Turning now to FIG. 7, there is shown a top planar view that is representative of the anterior rectus sheath layer 46, first rectus muscle layer 48, the second rectus muscle layer 50 and the third rectus muscle layer 52. These layers are approximately six inches wide and six and a half inches long. The anterior rectus sheath layer 46, first rectus muscle layer 48, the second rectus muscle layer 50 and the third rectus muscle layer 52 all have an elongate opening 68. The elongate opening 68 extends along the center line of the layers and is shown in FIG. 7 to be a rectangular cut out that is approximately one inch wide and 5.75 inches long. When the layers 46, 48, 50, 52 are overlaid, one on top of the other, all of the respective openings 68 are aligned. When the layers 46, 48, 50, 52 are overlaid with the other layers 44, 54, 56, 58, the apertures 66 are in communication or alignment with the elongate openings 68. The elongate opening 68 represents the linea alba of the abdomen.

Figure 8:
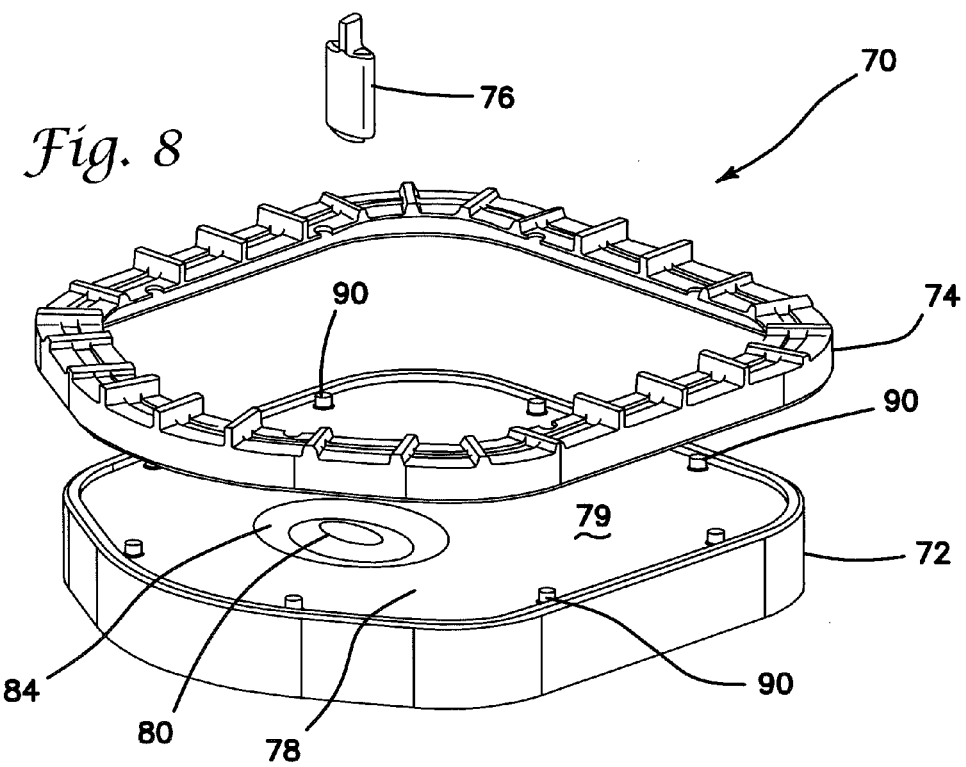
FIG. 8 is top perspective, exploded view of a mold for a skin layer of a first entry model according to the present invention.
Figure 9:
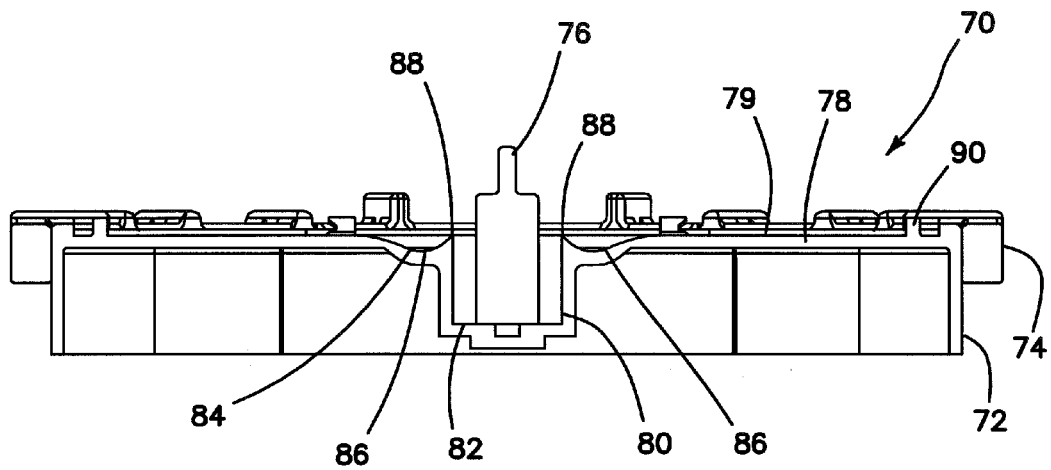
FIG. 9 is a side, cross-sectional view of a mold for a skin layer for a first entry model according to the present invention.
Figure 10:
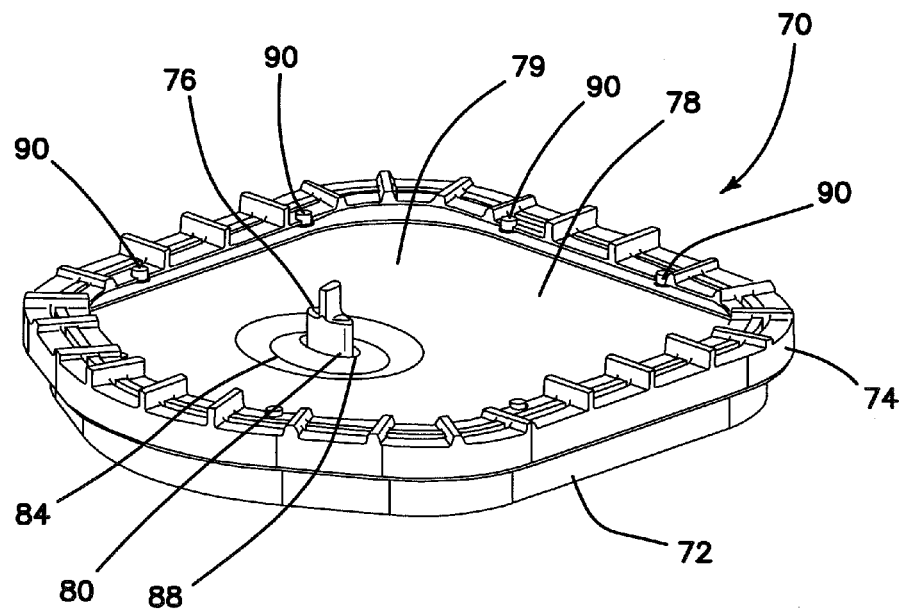
FIG. 10 is a top perspective view of a mold for a skin layer for a first entry model according to the present invention.

With reference back to FIG. 4 and additional reference to FIGS. 8-10, the skin layer 40 is formed by pouring the uncured and dyed silicone or thermoplastic elastomer into a special mold 70. An exploded, top perspective view of the mold 70 is shown in FIG. 8. The mold 70 includes a base 72, a top 74, and a core 76. The base 72 of the mold 70 includes a cavity 78 for receiving the plastic material. The cavity 78 is polygonal and substantially rectangular in shape. The cavity 78 includes a first floor 79 that surrounds a well 80 having a second floor 82. The second floor 82 of the well 80 is approximately 1 inch below the first floor 79 and includes a hole for inserting the core 76 inside the well 80. The cross-section of the well 80 is elliptical in shape having a long axis of approximately 1 inch and a short axis of approximately half an inch. The cross-section of the core 76 is also elliptical in shape, complementary to the well 80. The core 76 has a long axis of approximately 0.75 inches and a short axis of approximately 0.25 inches. With the core 76 in place inside the well 80 a space of approximately ⅛ inch is formed all around the core 76 between the outer surface of the core 76 and the inner surface of the well 80 into which silicone or thermoplastic elastomer is poured to form a tubular structure of the umbilical stalk 42a having an opening 92. The core 76 is approximately one inch and a half in length and extends above the pour line when inside the well 80.

The mold cavity 78 further includes a circumferential well 84 that is formed circumferentially around the first well 80. The circumferential well 84 has a concave or curved floor 86 that is approximately ⅛ inch deeper from the first floor 79. When silicone or thermoplastic elastomer is poured, an elliptical toroidal shape with a flat top is formed in the plastic material resulting in an increased thickness of material of approximately 0.25 inch in the area of the circumferential well 84 in the final product. The circumferential well 84 has an inner perimeter 88 that coincides with the wall of the first well 80. The annular distance from the inner perimeter 88 of the circumferential well 84 to the outer perimeter or end of circumferential well 84 is approximately 0.75 inches. The base 72 of the mold 70 further includes a plurality of pegs 90 upstanding from the first floor 79 to form holes in the resulting molded material. Although the first well 80 is described to have an elliptical shape, in another variation it is circular in shape with a corresponding circular core and circular circumferential well.

The core 76 is first inserted into the well 80 and silicone or thermoplastic elastomer is poured into the base 72 of the mold 70. The silicone or thermoplastic elastomer will run into the well 80 forming a tubular structure defined by the space between the core 76 and wall of the well 80. The silicone or thermoplastic elastomer will also run into the circumferential well 84 and cover the concave floor 86 forming a substantially toroidal shape of increased thickness of approximately 0.25 inch. The circumferential portion of increased thickness 94 is visible in FIGS. 4 and 5. The silicone or thermoplastic elastomer in its liquid state will cover the first floor 79 forming a planar area having a thickness of approximately ⅛ inch. The top 74 of the mold 70 will be placed over the base 72 of the mold 70. The top 74 is configured to cover only the perimeter of the poured silicone or thermoplastic elastomer to reduce the thickness of the silicone around the perimeter.

After the silicone or thermoplastic elastomer has solidified, the top 74 of the mold is removed and the molded silicone or thermoplastic elastomer is removed from the mold 70. The core 76 is also removed from the material leaving an elliptical opening 92 through the skin layer 40. The tubular structure or umbilical stalk 42a that is integrally formed by the well 80 with the rest of the skin layer 40 defines an opening 92 and is elliptical in shape having long axis of approximately 0.75 inches and a short axis of approximately 0.25 inches with a wall thickness of approximately ⅛ inch. The tubular structure 42a is inverted, that is, it is pushed through the opening 92 such that the surface in contact with the floor 79 of the mold 70 becomes the skin layer top surface 62. This advantageously permits the floor 79 of the mold to include texturing that would impart skin-like texture to the skin layer top surface 62. Also, by inverting the tubular structure 42a, not only an umbilical stalk is formed, but also, the portion of increased thickness 94 of the skin layer 40 will advantageously create a raised surface at the skin layer top surface 62 which is clearly visible in FIGS. 4 and 5. This raised portion 94 advantageously provides extra thickness of material for drawing sutures through and maintaining them in position without pulling through the silicone or thermoplastic material. Also, a circumferential raised portion 94 that surrounds the opening 92 creates a realistic belly-button effect that can be seen in FIG. 1. A variation of the skin layer 40 without the raised circumferential portion 94 is shown in FIG. 2. Although the umbilical stalk is approximately one inch long, it may be molded to be longer, approximately 1.25 inches to approximately 2.0 inches long. The skin layer 40 is planar sheet of molded material having a top surface 62 and a bottom surface 64 defining a skin layer thickness of approximately 0.1 inches. The skin layer 40 further includes an opening 92 with a tubular extension 42 integrally formed at opening 92 and interconnected with the rest of the layer 40. Surrounding the opening 92 is a circumferential raised portion 94 of increased thickness of approximately 0.2 inches. The raised portion 94 provides a convex outer surface that transitions into the remainder of the top surface 62 of the skin layer 40.

The mold 70 is 3D printed from Vero White Plus Fullcure 835 material. The distance from the pour line to the floor 79 is approximately 0.1 inches to create a skin layer thickness of approximately 0.1 inches. Around the perimeter, the thickness beneath the top 74 of the mold 70 is reduced to approximately 0.05 inches for a resulting skin layer thickness at the perimeter having a reduced thickness of approximately 0.05 inches which facilitates connection to the frame support 14. At the circumferential well 84 location, the thickness of the resulting skin layer 40 is approximately 0.2 inches. First, the mold 70 is sprayed with mold release solution and allowed to dry. In one variation, approximately 5 grams of Dragon Skin Silicone comprising 2.5 grams of part A and 2.5 grams of part B is mixed. Alternatively, a thermoplastic elastomer such as Kraton CL2003X is used for its cost savings and its ability to be sutured. Approximately 20 microliters of fleshtone color is mixed into the silicone. The core 76 is inserted into the well 80 and the silicone mixture is poured into the mold base 72. The mixture is spread evenly up to a pour line making sure all the wells are filled. The top 74 is placed over the base 72 of the mold 70. Excess silicone mixture is cleaned away and the silicone inside the mold 70 is allowed to dry for approximately one hour under a heat lamp or for two hours without a heat lamp.

After the silicone mixture has dried, the top 74 is removed and the formed skin layer 40 is peeled and removed from the base 72. The core 76 is also removed. The integrally formed umbilical stalk 42 is inverted by passing it through a formed opening 92. Silicone adhesive is provided and delivered using a syringe to the inside of the tube of the umbilical stalk 42. One or more clamps and in one variation, three clamps, such as binder clips, are used to clamp the inverted umbilical stalk 42 closed and sealed to create a bellybutton shape having a star or Y-shaped closure as shown in FIG. 1 or 2. The bottom-most part of the umbilical stalk 42 is clamped to create a deep umbilicus as opposed to clamping closer to the skin layer bottom surface 64. The skin layer 40 is turned over and excess glue that may have seeped out of the umbilicus 42 is removed. The adhesive is allowed to dry for approximately one hour and the clamps are removed. In one variation, an umbilical shaft 42b is provided. The umbilical shaft 42b is tubular having a central lumen and made of a thin layer of white silicone that is approximately 1 mm thick. The umbilical shaft 42b is glued to the umbilical stalk 42a to extend the umbilicus deeper into the layers and create a more realistic look and feel. The umbilical shaft 42b is glued to the umbilical stalk 42a such that the lumens interconnect. The proximal end of the umbilical shaft 42b is place over the stalk 42a and glued thereto and the distal end of the umbilical shaft 42b is free. In another variation, the distal end of the umbilical shaft is glued or integrally formed with the peritoneum layer 58.

All of the layers are properly oriented in the same direction and aligned such that the apertures 66 and openings 68 are superimposed. Then, with the skin layer 40 inverted and the umbilical stalk 42a either alone or with an extended umbilical shaft 42b is passed through the circular aperture 66 of the fat layer 44 and through the elongate openings 68 of the anterior rectus sheath layer 46, the first rectus muscle layer 48, the second rectus muscle layer 50, and the third rectus muscle layer 52 and then through the circular apertures 66 of the posterior rectus sheath layer 54, the transversalis fascia layer 56 and the peritoneum layer 58 as shown in FIG. 5. In one variation, the umbilicus 42 is left meeting the peritoneum layer 58 or in another variation, the umbilicus 42 is attached with adhesive to the peritoneum layer 58 and yet in another variation, integrally molded with the peritoneum layer 58. The inferior epigastric vein and artery layer 60 is optionally included. This layer 60 can be formed as a layer having a circular aperture 66 with embedded arteries and veins or simply comprise a pair of cylindrical silicone structures, one red and one blue, placed on one side of the midline and another pair of cylindrical silicone structures, one red and one blue in color, placed on the other side of the midline as shown in FIG. 4. The cylindrical silicone structures representing the epigastric veins and arteries are glued to at least one of the adjacent posterior rectus sheath layer 54 and the transversalis fascia layer 56. A price tag holder or other fastener can then be used to connect the layers together as shown in FIG. 5 with the umbilicus 42 shown protruding from the aperture 66 in the bottom-most peritoneum layer 58.

As can be seen in FIG. 5, the skin layer 50 and the peritoneum layer 58 is slightly larger than the other internal layers 44, 46, 48, 50, 52, 54, 56. In particular, the skin layer 50 and peritoneum layer 58 are larger by approximately 1.25 inches in length and width. Whereas the internal layers are approximately 6.5 inches long and 6 inches wide, the peritoneum layer 58 and skin layer 40 is approximately 8 inches long and 7.5 inches wide. These extra length and width portions are captured between the top and bottom frames of the support 14. Pegs in one of the top or bottom frames are passed through apertures in the skin layer 40 formed by mold pegs 90. The peritoneum layer 58 may also include apertures for passing of frame pegs. The top frame and bottom frame are then heat staked together capturing the anatomical portion 12. The resulting model 10 is approximately 1.5 inches thick.

The first entry model 10 is then placed inside an opening in the top cover 22 of a laparoscopic trainer 20 and securely attached. Laparoscopic first entry procedures such as the ones discussed in the background of this specification are then practiced on the model 10 employing one or more of the trocar instruments described above creating first entry in any of the locations described above including first entry directly through the umbilicus. Another location for first entry could be within a half inch on either side of the midline. Although such first entry is not surgically preferred, the practitioner will advantageously and quickly recognize a mistaken first approach when only the skin layer 40, the fat layer 44 and posterior rectus sheath 54 and peritoneum 58 layers are observed at the linea alba. The absence of a pink-colored first rectus muscle layer 48 should immediately alarm the practitioner during practice that penetration is at a wrong location. Another location for first entry penetration can take place at the left upper quadrant or right upper quadrant. As mentioned above, the left upper quadrant is different from the umbilicus region in that there are muscle layers. While penetrating at the upper right or left quadrants, the practitioner will observe the following layers: the skin layer 40, the fat layer 44, the anterior rectus sheath layer 46, the first rectus muscle layer 48, the second rectus muscle layer 50, the third rectus muscle layer 52, the posterior rectus sheath layer 54, the transversalis fascia layer 56 and the peritoneum layer 58. The layers are configured such that first entry through the umbilicus 42 will not penetrate any of the layers or will only penetrate the skin layer 40.

Figure 11:
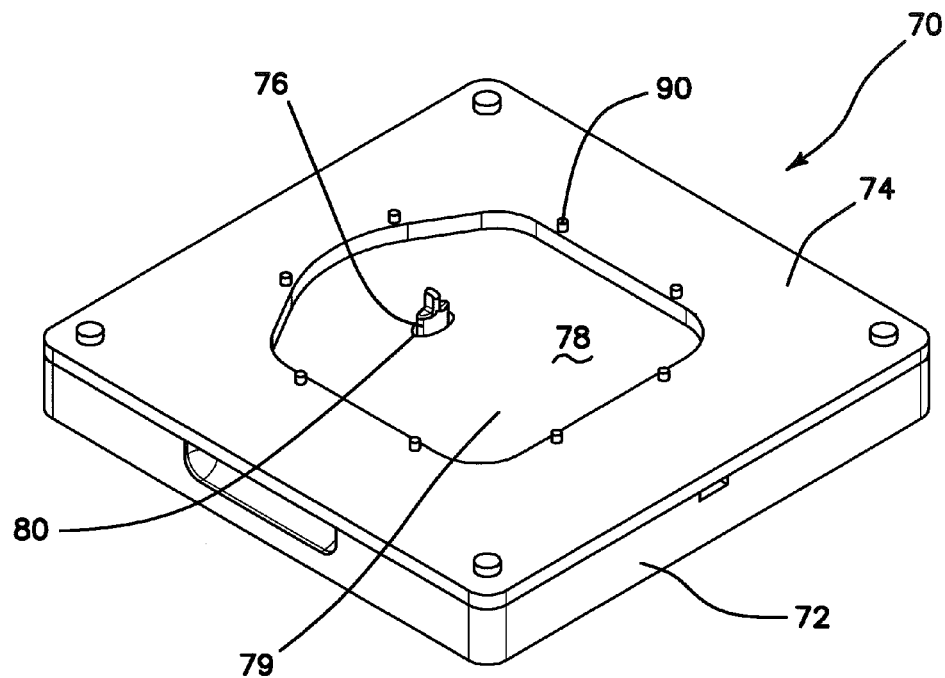
FIG. 11 is a top perspective view of a mold for a skin layer for a first entry model according to the present invention.
Figure 12:
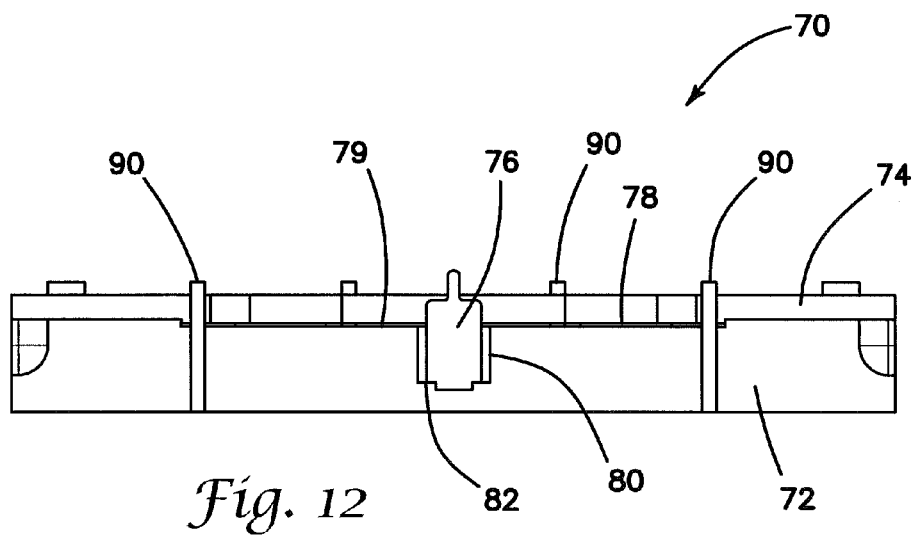
FIG. 12 is a side, cross-sectional view of a mold for a skin layer for a first entry model according to the present invention.

With reference to FIGS. 11-12, there is shown an alternative mold 70 according to the present invention that is used to create the skin layer 40. The mold 70 is made of a polymer known as Delrin® and includes a base 72, a top 74, and a core 76. The base 72 of the mold 70 includes a cavity 78 for receiving the plastic material. The cavity 78, which is approximately 0.1 inches deep, is in the shape of a large abdominal wall frame configured to hold all the layers of the model. The cavity 78 includes a first floor 79 that surrounds a well 80 having a second floor 82. The second floor 82 of the well 80 includes a hole for inserting the core 76 inside the well 80. The cross-section of the well 80 is elliptical in shape having a long axis of approximately 1 inch and a short axis of approximately half an inch. The well 80 is approximately three inches from one side of the cavity 78 and approximately three inches from the curved side of the cavity 78 and approximately 0.75 inches deep. The well 80 includes a secondary well at the second floor 82 which is also an ovular cutout that has a long axis of approximately 0.5 inches and a short axis of approximately 0.2 inches and approximately 0.1 inches deep. The secondary well is used to align the core 76 within the well 80. Although the first well 80 is described to have an elliptical shape, in another variation, the first well 80 is circular in shape with a corresponding circular core.

The cross-section of the core 76 is also elliptical in shape, complementary to the well 80. In a cross-section taken perpendicular to the longitudinal axis of the core 76, the core 76 has a long axis of approximately 0.75 inches and a short axis of approximately 0.25 inches. With the core 76 in place inside the well 80 a space of approximately ⅛ inch is formed all around the core 76 between the outer surface of the core 76 and the inner surface of the well 80 into which silicone or thermoplastic elastomer is poured to form a tubular structure of the umbilical stalk 42a having an opening 92. The core 76 is approximately one inch and a half in length and extends above the pour line when inside the well 80. The base 72 of the mold 70 further includes a plurality of pegs 90 for forming apertures through which pegs will pass for securing the skin layer 40 to the frame 14.

The core 76 is first inserted into the well 80 and silicone or thermoplastic elastomer is poured into the base 72 of the mold 70. The silicone or thermoplastic elastomer will run into the well 80 forming a tubular structure defined by the space between the core 76 and wall of the well 80. The silicone or thermoplastic elastomer in its liquid state will cover the first floor 79 forming a planar area having a thickness of approximately ⅛ inch. The top 74 of the mold 70 will be placed over the base 72 of the mold 70. The top 74 includes a through-hole having the same shape as the cavity 78 but sized slightly larger so as to cover only the perimeter of the poured silicone or thermoplastic elastomer. The top 74 includes a lip of approximately 0.39 inches in length that extends vertically approximately 0.05 inches. The lip is configured to create a flat edge around the skin layer that is only 0.05 inches allowing the skin layer to be easily heat staked in the location of the edge after assembly.

Figure 13:
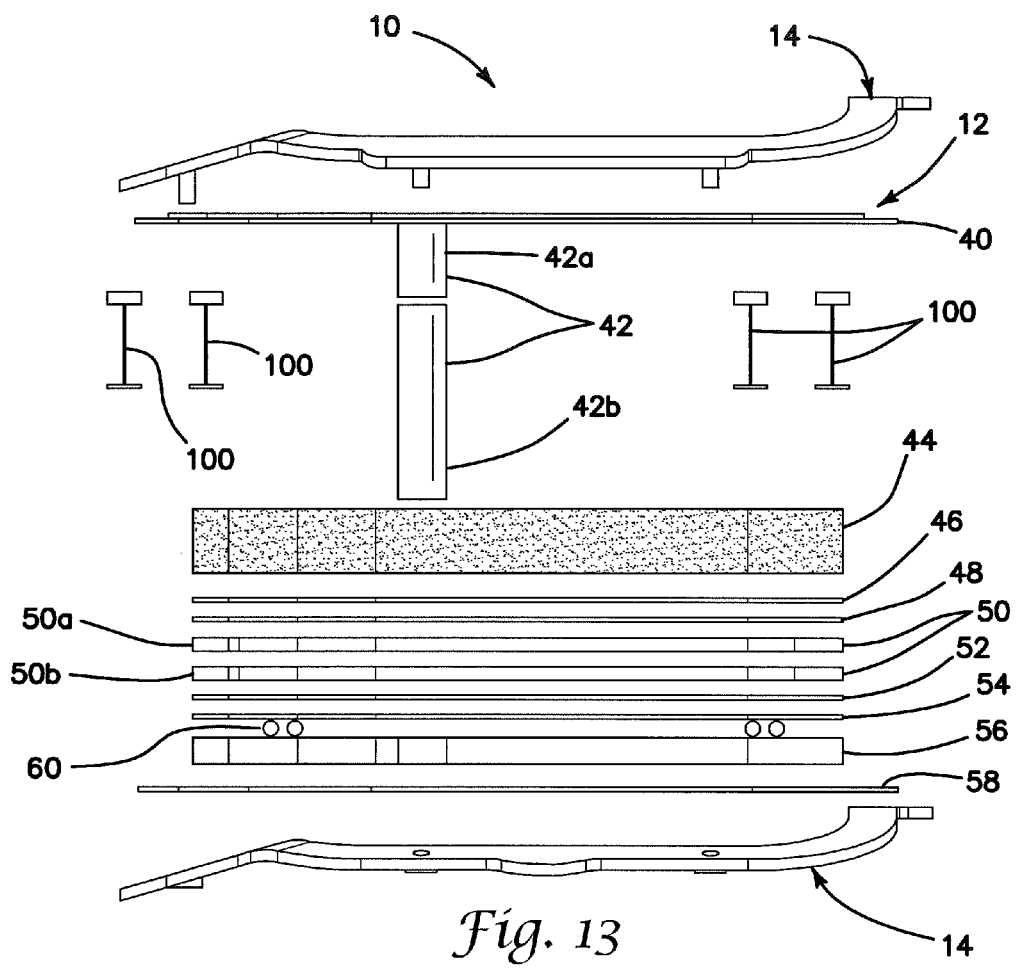
FIG. 13 is an exploded view of a first entry model according to the present invention.
Figure 14:
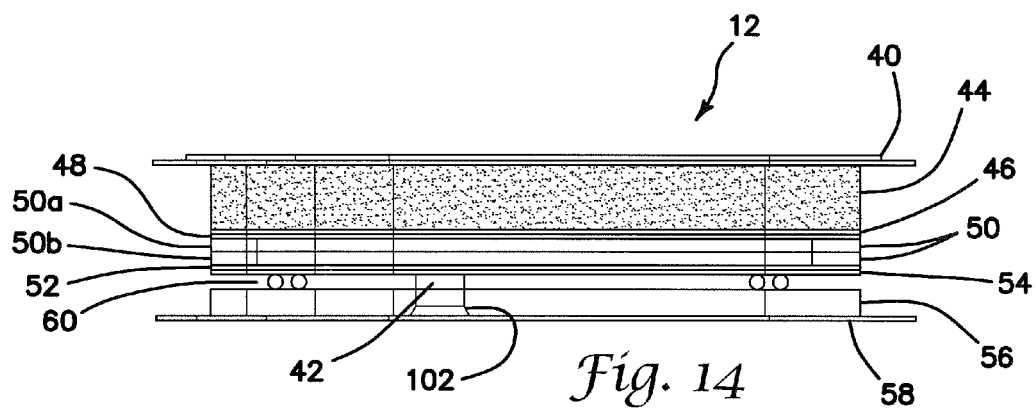
FIG. 14 is a side view of an anatomical portion of a first entry model according to the present invention.

Turning now to FIGS. 13 and 14, another variation of first entry model 10 will now be described with like reference numbers used to describe like parts. The model 10 includes an anatomical portion 12 connected between two parts of a frame-like support 14. The frame-like support 14 includes a top frame having protrusions that snap through the skin layer 40 and into apertures formed in a bottom frame. The anatomical portion 12 includes a skin layer 40, an umbilical stalk 42, a fat layer 44, an anterior rectus sheath layer 46, a first rectus muscle layer 48, a second rectus muscle layer 50, a third rectus muscle layer 52, a posterior rectus sheath layer 54, a transversalis fascia layer 56, and a peritoneum layer 58. The layers 40, 44, 46, 48, 50, 52, 54, 56, 58 are placed one on top of the other as shown in FIGS. 13-14 with the umbilical stalk 42 penetrating through all of the layers beneath the skin layer 40 except for the peritoneum layer 58.

The layers 40, 44, 46, 48, 50, 52, 54, 56, 58 are connected together with adhesive or other fastener. In one variation, the layers 40, 44, 46, 48, 50, 52, 54, 56, 58 are connected with at least one price-tag holder 100 punched through the layers and sandwiched between the skin layer 40 and the peritoneum layer 58 before being attached to the frame 14. In another variation, the layers are held together without adhesive or other fastener and clamped between the top frame and bottom frame. An optional inferior epigastric vein and artery layer 60 is included between the posterior rectus sheath layer 54 and the transversalis fascia layer 56 as shown in FIGS. 13-14.

With continued reference to FIGS. 13-14, the skin layer 40 is molded of silicone or thermoplastic elastomer (TPE) dyed with a flesh color. The skin layer 40 includes a top surface and bottom surface defining a thickness of approximately 0.1 inches. The skin layer 40 includes an integrally formed tubular umbilical stalk portion 42a having a central lumen formed by the core 76 during the molding process. An umbilical shaft 42b may be formed together with the umbilical stalk 42a or connected to the umbilical stalk 42a or placed as a separate tubular portion within the anatomical portion 12. The umbilical stalk 42 is made of a thin layer of white silicone that is approximately 1 millimeter thick. The umbilical stalk 42a by itself or together with the umbilical shaft 42b is configured to be long enough to travel through all the layers 44, 46, 48, 50, 52, 54 and 56 until it reaches between the transversalis fascia layer 56 and the peritoneum layer 58. The distal end of the umbilical stalk 42 (or umbilical shaft 42b if one is employed) is cut one or more times such that the cut extends from the distal end of the umbilical stalk towards the proximal end of the umbilical stalk. Several cuts are provided at a length to sufficiently flare the distal end of the umbilical stalk. In one variation, four or more cuts are formed to form four or more pieces or flaps at the distal end of the simulated umbilicus 42. These flaps 102 are fanned out over the distal-facing surface of the transversalis fascia layer 56 as shown in FIG. 15. The umbilical stalk 42 is adhered to the transversalis fascia layer 56 using two types of adhesive. Because the transversalis fascia layer 56 is made of cellular polyethylene foam which is porous, the surface insensitive cyanoacrylate glue cannot be used alone to adhere the silicone because it will burn through the foam and not adhere. Therefore, a heavy duty spray adhesive is sprayed on the foam transversalis fascia layer 56 and allowed to dry for a few minutes. The surface insensitive cyanoacrylate glue is then placed on the silicone umbilical stalk 42 and the distal flaps 102 of the stalk 42 are adhered to the distal-facing surface of the transversalis fascia layer 56. The spray adhesive, which alone is not strong enough to bond the foam and the silicone, protects the foam from the cyanoacrylate.

Still referencing FIGS. 13-14, the fat layer 44 needs to react similarly to real fat when grasped or touched externally and it needs to look like fat under optical entry and to respond physically like to fat when pierced internally. In one variation, the fat layer 44 is made of cellular foam that is porous, sponge-like and yellow in color. The yellow foam looks like fat under optical entry. In another variation, the fat layer 44 is made of polyurethane foam that is yellow in color. Memory foam is polyurethane with additional chemicals increasing its viscosity and density. It is also called viscoelastic polyurethane foam or low-resilience polyurethane foam or polyurethane foam having a slow recovery. The memory foam feels realistic when the user touches the model 10 at the skin layer 40 and also when the user enters the fat layer 44 optically with a trocar. When illuminated, the polyurethane fat layer 44 shines advantageously creating the illusion that the fat is wet internally. Additionally, when the fat layer 44 is cut, the polyurethane foam recovers its shape. The ability of the fat layer 44 to recover its shape is important for the Hasson cut-down technique because the surgeon must practice retracting the fat layer 44 before cutting the fascia. The practice is more realistic if the fat layer 44 tends to return to its original location requiring the practitioner to retract the fat layer 44. In another variation, the fat layer 44 is made of a thermoplastic elastomer (TPE) with an additive such as baking soda or mineral oil to create a material that acts more like real fat. An additive such as baking soda will create a porous fat layer allowing the trocar to easily pierce and enter the fat layer 44 and advantageously provide a more realistic appearance under optical entry. An additive such as mineral oil will create a gel that has the shape-recovery characteristics similar to the memory foam but provides a more realistic feel when touched externally. TPE with either the mineral oil or baking soda as an additive provides a tactile response similar to fat when grasped. The fat layer 44 is approximately 1.5-4.0 cm thick in a standard model 10. An obese model 10 will be described hereinbelow.

In another variation of the model, the skin layer 40 is attached to the fat layer 44. In particular, the skin layer 40 is cast over the fat layer 44. The silicone or TPE of the skin layer 40 will adhere to the fat layer 44 located directly below the skin layer 40 as it cures/cools. In such a variation, the mold 70 is made deeper to receive the fat layer 44. As described above with respect to another variation in which the umbilical stalk is inverted to create a realistic umbilicus, this variation in which the skin layer 40 is attached to the fat layer 44, the umbilical stalk cannot be inverted because the silicone or the TPE is poured over the fat layer and attaches thereto as it cures. Therefore, the core 76 is a different shape than described above with respect to FIGS. 11-12. Instead, the core 76 is shaped such that the cured silicone results in a shape that simulates an inverted umbilicus. For example, the top of the core 76 may be provided with a recess with texturing that simulates the belly button as viewed from outside the patient. The fat layer 44 is placed into the mold base 72 that is modified with a larger receptacle for receiving a fat layer 44 and the silicone or TPE is be poured over it and then the umbilicus-shaped core 76 may be previously placed into a well or is placed on top to mold the umbilicus shape into the silicone skin layer 40 without inverting or gluing a lumen of the umbilical stalk 42. In this variation, the step of inverting the skin layer 40 and pinched together to create the umbilicus shape would not be needed.

Figure 16B:
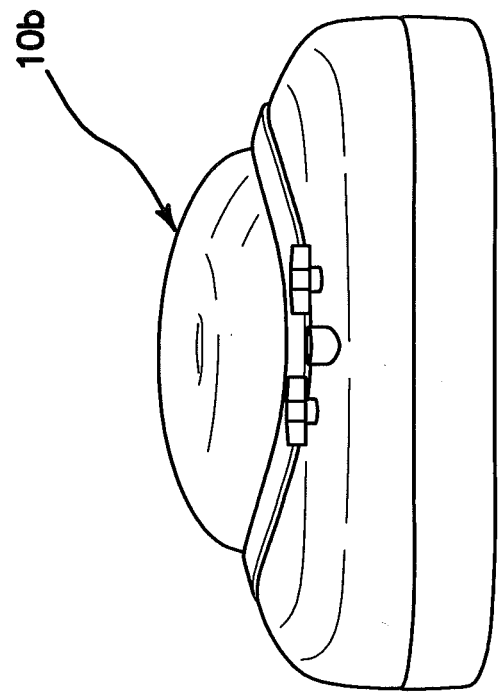
FIG. 16B is an end view of an obese first entry model connected to a top cover of a trainer according to the present invention.
Figure 16A:
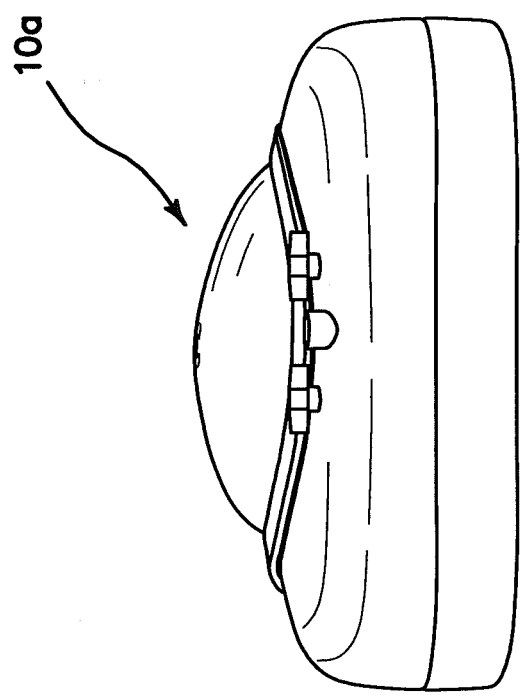
FIG. 16A is an end view of a standard first entry model connected to a top cover of a trainer according to the present invention.

In addition to a model with a normal abdominal wall anatomy, an obese model is provided in the present invention. The obese model includes all of the same layers as shown in FIGS. 13-14 but includes a fat layer 44 that is significantly thicker. The fat layer 44 of the obese model can be made of the same materials already described herein. Whereas the thickness of the standard fat layer 44 is approximately 1.5 to 4.0 cm, the fat layer 44 in the obese model is approximately 4.0 to 7.0 cm. The obese model also includes a special skin layer 40. The skin layer 40 can be made as previously stated herein and be of the same size in the x-y plane as the skin layer in the standard model or the same size in the x-y plane as the fat layer in the obese model or, alternatively, the skin layer 40 can be larger in size with respect to the size of the fat layer of the obese model in the x-y plane or larger in size with respect to the size of the fat layer of the standard model. If the skin layer is the same size and shape, the obese model 10b will have a domed effect as can be seen in FIG. 16B when compared to a standard model 10a illustrated in FIG. 16A. The same-sized skin layer 40 in combination with the thicker fat layer 44 or otherwise a skin layer 40 that is the same size or is slightly smaller than the dimensions of the fat layer 44 will result in the thicker fat layer(s) 44 of the obese model being compressed into the same space previously made for the standard model. This compression provides the obese model 10A with the appearance of an obese patient when using any of the four laparoscopic entry techniques. However, the obese model 10A will not be easily and realistically grasped with the smaller and tighter skin layer 40 encompassing the larger fat layer 44; however, a larger skin layer 40 can be employed. If TPE or memory foam is used for the fat layer 44, the larger skin layer 40 will allow the fat layer 44 to expand into the extra space of a larger skin layer 40 when gasped and moved. Advantageously, the ability of the fat layer to move freely under the skin layer allows the surgeon to grasp the fat layer and pull at the umbilicus creating a more realistic entry. FIGS. 16A and 16B illustrate a laparoscopic trainer 20 with legs 26 removed such that the top cover 22 is seated directly onto the base 24 of the trainer 20 reducing the size of the cavity 28 such that first entry procedures may be more easily and conveniently practiced. The top cover 22 forms a shell over the base 24 and fits securely around an upstanding lip so that the top cover 22 does not dislocate with respect to the base 24. The first entry model 10 is inserted into an aperture 30 in the top cover 22 of the trainer 20 and a simulated organ is placed into the cavity 28 of the trainer 20 such that when a practitioner enters through the first entry model 10 by piercing the various layers, the practitioner will see the simulated organ located within the cavity 28. One or more organs may be placed inside the cavity 28. In one variation, at least a simulated omentum is provided inside the cavity 28. The simulated omentum is made of a sheet of fabric or thin layer of silicone. The sheet is placed inside the cavity 28 of the trainer 20 and the sheet is configured such that when the first entry model 10 is pierced by an instrument such as an optical trocar having a laparoscope inserted into the trocar, the practitioner will see the sheet on the video display monitor. In one variation, the sheet is suspended within the cavity 28 using clips attached to the trainer 20. Alternatively, the sheet may be placed on a frame or just laid over the base. The thin sheet of material, representing the omentum, is yellow in color and loosely connected to the trainer and is configured such that it would flutter when insufflation gasses are delivered into the cavity such as with an insufflation trocar after piercing the first entry model 10. In such a case, the representative omentum layer is attached to the trainer selectively leaving portions of the simulated omentum unattached to enable the flutter effect. The presence of the simulated omentum layer comprising a thin sheet is advantageous because when a surgeon first enters into the abdominal cavity and insufflation is delivered to expand the abdomen in order to create a working space, the surgeon knows that the abdominal wall was successfully entered when visually the representative omentum or viscera is observed and further seen fluttering with the force of insufflation gasses. This training feature is advantageously provided in the present invention in the combination of the first entry model 10, a trainer 20 and simulated omentum such as that depicted in FIG. 3 or FIGS. 16A and 16B of the present invention. Use of the simulated omentum sheet with the trainer 20 configured as shown in FIGS. 16A and 16B advantageously provides a smaller space for the cavity 28, creating a more air-tight and dark location to simulate insufflation and observe the fluttering of the simulated omentum.

With reference back to FIGS. 13-14 and with reference to Table 1 below, the anterior rectus sheath layer 46 is made of solid ethylene vinyl acetate (EVA) foam having a white color and is approximately 1 millimeter thick. The first rectus muscle layer 48 is made of solid EVA foam and is red in color and approximately 1 millimeter thick. The second rectus muscle layer 50 is made of cellular polyethylene foam having a pink color. In one variation, the second rectus muscle layer 50 comprises two layers 50a, 50b of cellular polyethylene foam having a total thickness of approximately 0.25 inches. The second rectus muscle layer 50 is cellular foam that includes air bubbles that provide a cellular texture. Each second rectus muscle layer 50a, 50b is approximately 0.125 inches thick. The third rectus muscle layer 52 is made of solid EVA foam having a red color and is approximately 1 millimeter thick.

In one variation, the posterior rectus sheath layer 54 is not made of foam material, but instead, is made of an interfacing fabric. The interfacing fabric is made of strong polyester fibers that can stretch considerably before ripping. Furthermore, the interfacing fabric is thin being approximately 0.2 mm thick and white in color. The interfacing fabric layer 54 is thin enough to allow a trocar or Veress needle to puncture through the fabric when using an entry tactic other than a Hasson cut down technique and capable of being cut when employing the Hasson cut down technique. At the linea alba location, the posterior rectus sheath layer 54 in the model represents the fascia of both the anterior and posterior rectus sheath that come together at the linea alba. The fabric of the posterior rectus sheath layer 54 represents the linea alba configured by exposing the posterior rectus sheath layer through and by way of an elongate opening 68 formed in anterior rectus sheath layer 46, first rectus muscle layer 48, second rectus muscle layer 50 and third rectus muscle layer 52. The elongate opening 68 in each of these layers are shown in FIG. 17. In a first entry technique employing the Hasson cut down method, the fascia of the linea alba as represented by the posterior rectus sheath layer 54 is grasped and pulled through the incision in order to safely incise the layer 54. Hence, the stretchable fabric layer 54 advantageously provides ability to pull the fascia layer up so that safe cutting techniques may be practiced using this model.

The transversalis fascia layer 56 is made of cellular polyethylene foam that is white in color and approximately 0.25 inches thick. The fascia layer 56 has a cellular texture arising from the cellular polyethylene foam as opposed to the solid EVA foam layers. The peritoneum layer 58 is made of solid EVA foam that is white in color and approximately 1 millimeter thick. The peritoneum layer 58 may also be made of silicone or TPE. The optional inferior epigastric vein and artery layer 60 layer includes solid or hollow elongate cylindrical structures made of silicone or Kraton® polymer or other elastomer having a cross-sectional diameter of approximately 0.15 inches. The arteries are red in color and the veins are blue in color. The layers, as described above, provide an optical entry with a very realistic appearance to the end user. The layers of foam are capable of being punctured with a trocar and look realistic under optical entry via a laparoscope inserted into an optical trocar. Also, the foam layers provide a realistic tactile feedback to the practitioner when using Veress needle entry as well as with optical entry. The thicknesses, colors and compositions of the various layers of the abdominal wall of the first entry model 10 are shown in Table 1 below.

TABLE 1

Abdominal Wall Layers

| Layer | Material | Thickness Standard model | Thickness Obese model | Color |
|---|---|---|---|---|
| Skin | Silicone or TPE | 0.1" | 0.1" | Flesh Tone |
| Fat | Cellular Foam Memory Foam TPE with Additive Gel | 1.5 to 4.0 cm | 4.0 to 7.0 cm | Yellow |
| Anterior Rectus Sheath | Solid Foam | 1 mm | 1 mm | White |
| Rectus Muscle | Solid Foam | 1 mm | 1 mm | Red |
| Rectus Muscle | Cellular Foam | ¼" | ¼" | Pink or White |
| Rectus Muscle | Solid Foam | 1 mm | 1 mm | Red |
| Posterior Rectus Sheath | Interfacing Fabric | 0.2 mm | 0.2 mm | White |
| Transversalis Fascia | Cellular Foam | ¼" | ¼" | White |
| Peritoneum | Solid Foam, Silicone or TPE | 1 mm | 1 mm | White |

Turning now to FIG. 17, there is shown a top planar view that is representative of the anterior rectus sheath layer 46, first rectus muscle layer 48, the second rectus muscle layer 50 and the third rectus muscle layer 52. These layers are approximately six inches wide and six and a half inches long. The anterior rectus sheath layer 46, first rectus muscle layer 48, the second rectus muscle layer 50 and the third rectus muscle layer 52 all have an elongate opening 68. The elongate opening 68 extends along the center line of the layers and is shown in FIG. 17 to be a substantially rectangular cut out that is approximately one inch wide and approximately 5.75 inches long. The elongate opening 68 represents the lack of muscle at the linea alba. However, the linea alba varies between patients and in other variations of the model, the width of the elongate opening 68 can range from 8 mm to 30 mm. Of course, the shape of the opening may also vary. When the layers 46, 48, 50, 52 are overlaid, one on top of the other, all of the respective openings 68 are aligned. When the layers 46, 48, 50, 52 are overlaid with the other layers 44, 54, 56, 58, the ovular holes 66 (described with respect to FIG. 18) are in communication or alignment with the elongate openings 68 and slits 104 (described with respect to FIG. 19). The posterior rectus sheath 54 is visible through the aligned elongate openings 68 simulating the appearance of the linea alba of the abdomen.

Figure 18:
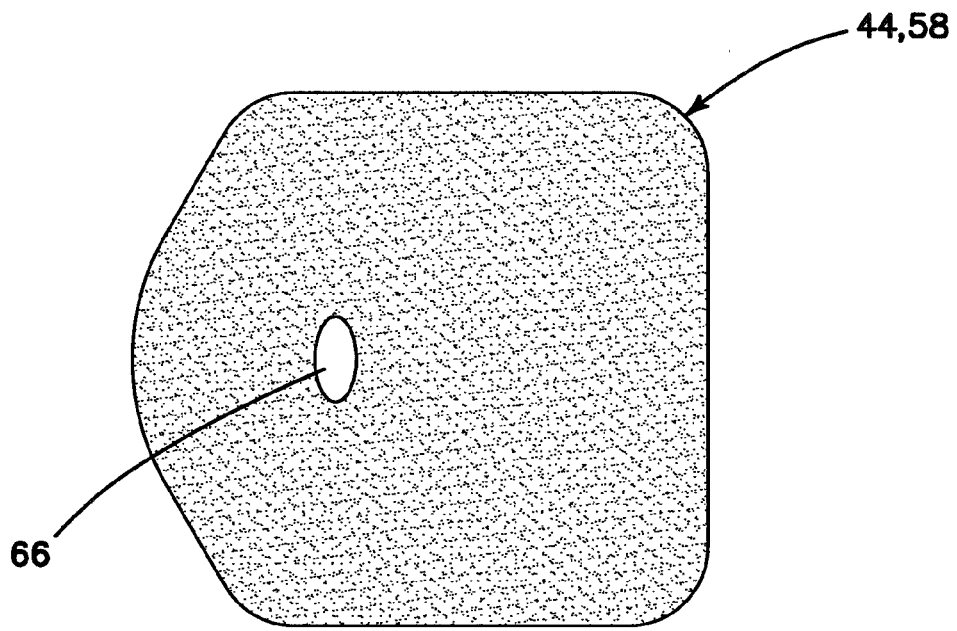
FIG. 18 is a top planar view that is representative of more than one layer in an anatomical portion of a first entry model according to the present invention.

Turning now to FIG. 18, there is shown a top planar view that is representative of the fat layer 44 and the peritoneum layer 58. These layers are approximately six inches wide and six and a half inches long. The fat layer 44 and the peritoneum layer 58 all have an ovular hole 66 that has a length of approximately one inch and a width of approximately 0.5 inches. The ovular hole 66 is located approximately two inches from one side and is in the same location in the fat layer 44 and the peritoneum layer 58 such that when overlaid the ovular holes 66 line up to provide a pathway for the umbilical stalk 42 across these layers. The ovular hole 66 closely hugs the umbilical stalk 42 compared with a circular hole advantageously providing a more realistic visualization.

Figure 19:
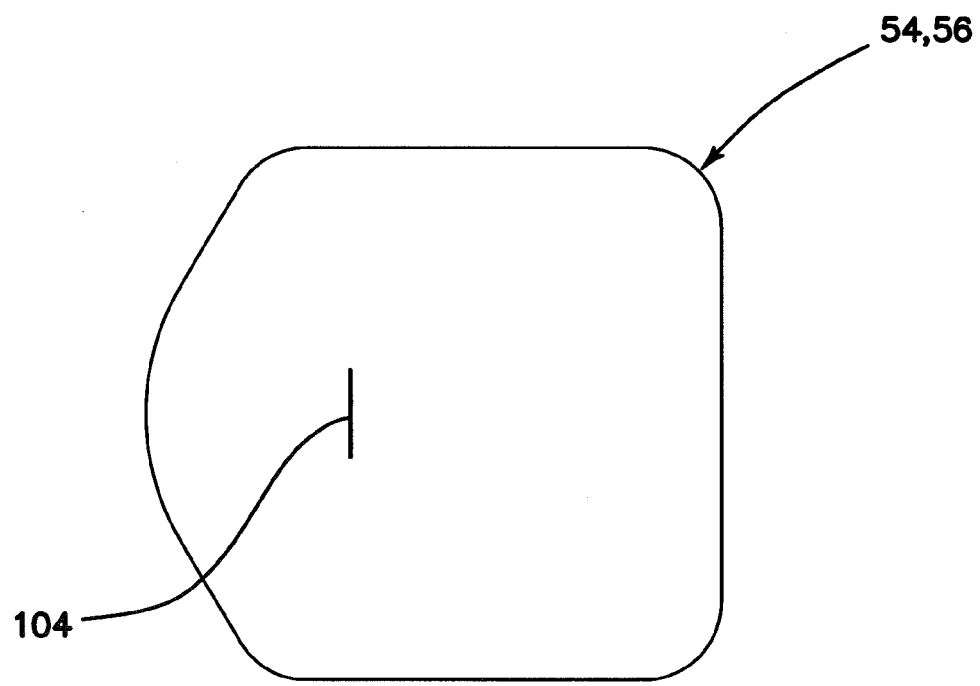
FIG. 19 is a top planar view that is representative of more than one layer in an anatomical portion of a first entry model according to the present invention.

Turning now to FIG. 19, there is shown a top planar view that is representative of the posterior rectus sheath layer 54 and the transversalis fascia layer 56. These layers 54, 56 include a slit 104. The slit 104 is approximately 1 inch in length and is a narrow cut substantially perpendicular to the representative linea alba so that the ends of the slit 104 are not aligned with the longitudinal axis of the linea alba. The slit 104 allows the umbilical stalk 42 to pass through to its termination between the transversalis fascia layer 56 and the peritoneum layer 58 while still allowing these layers to touch or closely approximate the curvature of the umbilical stalk 42. In this configuration, the posterior rectus sheath layer 54 and the transversalis fascia layer 56 closely hug the umbilical stalk 42 which advantageously makes the visualization more realistic such that these layers are seen or felt during entry especially when employing a Hasson or Veress needle first entry. In one variation in which the fat layer 44 comprises more than one layer, the one or more distal fat layer(s) 44 are also configured with a slit 104 as shown in FIG. 19; whereas the proximal fat layer(s) 44 are configured with an ovular hole 66 as shown in FIG. 18.

In another variation, the first entry model 10 includes simulations for adhesions present in real anatomy. Frequently, organs and tissues located underneath the peritoneum will adhere to the peritoneum and create an adhesion. While practicing first entry techniques, it is necessary for the surgeon to learn how to be wary of adhesions and how to navigate with respect to them in the event they occur in the patient. The present invention provides a first entry model that allows the surgeon to practice encountering and navigating adhesions in a first entry laparoscopic environment. It is necessary for the surgeon to be careful, because aggressive entry in the location of an adhesion may result in accidental piercing of the adhered tissue or organ. In this variation of the first entry model 10, adhesions are included in the model. For example, a simulated adhesion is a piece of simulated bowel that is attached to the undersurface of the peritoneum layer 58. The piece of simulated bowel is made of silicone. The adhesion may be made of any suitable material and adhesive may be used to connect the adhesion to the peritoneum layer 58. In another variation, a piece of silicone is used to attach the simulated bowel to the peritoneum layer 58. In the first entry model with adhesions, the peritoneum layer 58 may be made of silicone or TPE instead of foam in order to more easily attach a silicone adhesion to the peritoneum layer 58. Also, the peritoneum layer 58 that is made of silicone or TPE will stretch as the adhesion is being removed making the simulation more realistic. To signify that an adhesion is present, a scar indicating a previous surgery may be molded or printed onto the surface of the skin layer 40 in a location above the adhesion to the peritoneum layer; thereby, the surgeon would anticipate an adhesion being present in the general area beneath the layers in the abdominal cavity. The scar would require the practitioner to make a decision about the best place to enter or pierce the first entry model 10 and thus adds an important practice dimension to the model 10. A scar may or may not be provided. If a scar is not provided on the skin layer 40, an adhesion may still be provided to surprise the practitioner adding yet another practice dimension to the first entry model 10. Generally, after the surgeon has entered and found the adhesion, the surgeon can insert a grasper to pull at the adhesion such as a piece of bowel, stretch the adhesion away from the peritoneum and/or bowel, and use a scalpel or scissors to cut through the silicone that is located between the bowel and peritoneum layer 58 and used to attach the simulated adhesion to the peritoneum layer 58 in order to free the adhesion.

The first entry model 10 of the present invention is particularly suited for laparoscopic procedures and may be employed with a laparoscopic trainer 20; however, the invention is not so limited and the first entry model 10 of the present invention can be used alone to practice first entry surgical procedures equally effectively. The present invention advantageously provides numerous practice possibilities for the surgeon who is learning or practicing first entry techniques while at the same time being manufactured of simple silicone and foam materials providing maximum costs savings while also providing a most realistic tactile and visual experience. The first entry model 10 may be used repeatedly allowing the surgeon to practice numerous entry techniques on the same model before discarding the model which can then be easily replaced with a new model when used with the laparoscopic trainer.

It is understood that various modifications may be made to the embodiments of the first entry model 10 disclosed herein. Therefore, the above description should not be construed as limiting, but merely as exemplifications of preferred embodiments. Those skilled in the art will envision other modifications within the scope and spirit of the present disclosure.

We claim:

1. A simulated tissue structure, comprising:
a support;
an artificial anatomical portion configured to simulate a region of an abdominal wall; the anatomical portion being connected to the support such that the anatomical portion is penetrable from a first side to a second side of the anatomical portion; the anatomical portion including a plurality of simulated tissue layers arranged in juxtaposition with each other; the simulated tissue layers including a simulated skin layer located above the remaining layers; each of the remaining layers having an opening extending through the layer; the simulated skin layer having a top surface and a bottom surface; the top surface of the simulated skin layer defines a first side of the anatomical portion; a tubular structure having a proximal end and a distal opening at a distal end; the distal end of the tubular structure extending through one or more openings in the remaining layers;
wherein one of the remaining layers includes a simulated peritoneum layer and a first layer; the simulated peritoneum layer having a top surface and a bottom surface; the bottom surface of the simulated peritoneum layer forming the second side of the anatomical portion; the first layer having a top surface and a bottom surface; the bottom surface of the first layer overlaying the top surface of the simulated peritoneum layer;
wherein the distal end of the tubular structure is connected to the first layer; and
wherein the proximal end of the tubular structure is connected to the simulated skin layer.

2. The simulated tissue structure of claim 1 further including a second layer having a top surface and a bottom surface; the bottom surface of the second layer overlaying the top surface of the first layer.

3. The simulated tissue structure of claim 1 wherein the distal end of the tubular structure is connected to the bottom surface of the first layer.

4. The simulated tissue structure of claim 2 wherein the second layer is made of fabric.

5. The simulated tissue structure of claim 1 wherein the first layer is made of cellular polyethylene foam.

6. The simulated tissue structure of claim 1 wherein the simulated skin layer includes an opening defining an opening at the proximal end of the tubular structure; wherein the opening is closed.

7. The simulated tissue structure of claim 1 wherein the tubular structure is connected to the top surface of the simulated skin layer and extends through the opening in the simulated skin layer.

8. A simulated tissue structure configured to simulate an abdominal wall, comprising:
   a simulated skin layer having a top surface and a bottom surface;
   a simulated fat layer having a top surface and a bottom surface; the bottom surface of the simulated skin layer overlaying the top surface of the simulated fat layer;
   a first simulated muscle layer having a top surface and a bottom surface;
   a second simulated muscle layer having a top surface and a bottom surface;
   a third layer having a top surface and a bottom surface; the third layer being located between the first and second simulated muscle layers;
   a fourth layer having a top surface and a bottom surface;
   a fifth layer having a top surface and a bottom surface; the bottom surface of the fourth layer overlaying the top surface of the fifth layer;
   a simulated peritoneum layer having a top surface and a bottom surface; the bottom surface of the fifth layer overlaying the top surface of the simulated peritoneum layer;
   wherein the simulated skin layer is made of silicone and includes a tubular structure extending through one or more of the other layers; the tubular structure having an opening at the proximal end that is closed.

9. The simulated tissue structure of claim 8 wherein the fourth layer is made of fabric.

10. The simulated tissue structure of claim 8 wherein the simulated fat layer is made of memory foam.

11. The simulated tissue structure of claim 8 wherein the third layer and fifth layer are made of cellular polyethylene foam.

12. The simulated tissue structure of claim 8 wherein the third layer and fifth layer are made of cellular polyethylene foam and the fourth layer is made of fabric.

13. The simulated tissue structure of claim 8 wherein the first simulated muscle layer and the second simulated muscle layer are made of ethyl vinyl acetate foam and are red in color.

14. The simulated tissue structure of claim 8 further including a simulated adhesion attached to the bottom surface of the simulated peritoneum layer.

15. The simulated tissue structure of claim 14 wherein the simulated skin layer includes a simulated scar in a location above the simulated adhesion.

16. A surgical simulation system, comprising:
   an abdominal wall model, including:
      a support; and
      an artificial anatomical portion configured to simulate a region of an abdominal wall; the anatomical portion being connected to the support such that the anatomical portion is penetrable from a first side to a second side of the anatomical portion; the anatomical portion including a plurality of simulated tissue layers arranged in juxtaposition with each other; the simulated tissue layers including a simulated skin layer located above the remaining layers; the simulated skin layer having a top surface and a bottom surface; the top surface of the simulated skin layer defining a first side of the anatomical portion;
   a trainer, including:
      a base;
      a top cover having a top surface and a bottom surface; the top cover being connected to and spaced apart from the base to define an internal cavity between the top cover and the base; the top cover having a first opening;
   wherein the abdominal wall model is removably located inside the first opening; the model being connected to the top cover such that penetration of the anatomical portion provides access to the internal cavity of the trainer; and
   further including a simulated tissue structure located inside the cavity; and a thin layer located inside the internal cavity of the trainer between the anatomical portion and the simulated tissue structure.

17. The surgical simulation system of claim 16 wherein the thin layer is suspended inside the internal cavity.

18. The surgical simulation system of claim 16 wherein the thin layer is connected to the trainer.

19. The surgical simulation system of claim 16 wherein the thin layer is made of silicone.

20. The surgical simulation system of claim 16 wherein the thin layer is made of fabric.

21. The surgical simulation system of claim 16 wherein the thin layer is configured to flutter when insufflation gasses are delivered into the cavity such as with an insufflation trocar after piercing the anatomical portion.

22. The surgical simulation system of claim 18 wherein portions of the thin layer are not attached to the trainer.

* * * * *